(12) United States Patent
Kim et al.

(10) Patent No.: US 11,055,890 B2
(45) Date of Patent: Jul. 6, 2021

(54) ELECTRONIC DEVICE FOR GENERATING AVATAR AND METHOD THEREOF

(71) Applicant: Samsung Electronics Co., Ltd., Gyeonggi-do (KR)

(72) Inventors: Daemyung Kim, Gyeonggi-do (KR); Ilhoe Jung, Gyeonggi-do (KR); Chanmin Park, Gyeonggi-do (KR); Jinho Lim, Gyeonggi-do (KR); Sanglae Kim, Gyeonggi-do (KR); Jeehae Kim, Gyeonggi-do (KR); Seyoung Jang, Gyeonggi-do (KR); Byungpo Choi, Gyeonggi-do (KR); Jungeun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/741,980

(22) Filed: Jan. 14, 2020

(65) Prior Publication Data
US 2020/0226811 A1    Jul. 16, 2020

(30) Foreign Application Priority Data
Jan. 14, 2019    (KR) .................... 10-2019-0004906

(51) Int. Cl.
*G06T 13/40* (2011.01)

(52) U.S. Cl.
CPC .................... *G06T 13/40* (2013.01)

(58) Field of Classification Search
None
See application file for complete search history.

(56) References Cited

U.S. PATENT DOCUMENTS

| 8,902,344 | B2 | 12/2014 | Oyama et al. |
| 9,236,032 | B2 | 1/2016 | Choi et al. |
| 9,406,162 | B2 | 8/2016 | Lucey et al. |
| 9,569,814 | B2 | 2/2017 | Oyama et al. |
| 10,360,444 | B2 | 7/2019 | Sugita et al. |
| 2008/0306951 | A1 | 12/2008 | Rodefer |
| 2010/0169184 | A1* | 7/2010 | Hamilton, II .......... G06Q 50/01 705/26.1 |
| 2013/0169850 | A1 | 7/2013 | Oyama et al. |
| 2013/0314405 | A1 | 11/2013 | Lucey et al. |
| 2015/0042687 | A1 | 2/2015 | Oyama et al. |
| 2015/0078621 | A1 | 3/2015 | Choi et al. |

(Continued)

FOREIGN PATENT DOCUMENTS

| KR | 10-2009-0099896 A | 9/2009 |
| KR | 10-0927326 B1 | 11/2009 |

OTHER PUBLICATIONS

International Search Report dated May 11, 2020.

*Primary Examiner* — Michelle Chin
(74) *Attorney, Agent, or Firm* — Cha & Reiter, LLC

(57) ABSTRACT

In one embodiment, an electronic device is disclosed. The electronic device includes a processor and a memory. The memory stores instructions that, when executed, cause the processor to obtain character data indicating an appearance of an avatar, to obtain asset data indicating a costume or an accessory of the avatar, to generate region information indicating a relationship between a plurality of regions of the appearance of the avatar and a location of the costume or the accessory, and to store the asset data and the region information in the memory.

18 Claims, 18 Drawing Sheets

(56) References Cited

U.S. PATENT DOCUMENTS

2016/0371542 A1  12/2016  Sugita et al.
2017/0003738 A1* 1/2017  Silkin .................... G06F 3/017
2018/0122148 A1* 5/2018  Janzer .................... G06F 8/34
2019/0371033 A1* 12/2019 Scapel ................. G06T 15/503

* cited by examiner

ELECTRONIC DEVICE FOR GENERATING AVATAR AND METHOD THEREOF

CROSS-REFERENCE TO RELATED APPLICATION(S)

This application is based on and claims priority under 35 U.S.C. § 119 to Korean Patent Application No. 10-2019-0004906, filed on Jan. 14, 2019, in the Korean Intellectual Property Office, the disclosure of which is incorporated by reference herein its entirety.

BACKGROUND

1. Field

One or more embodiments of the instant disclosure generally relate to an electronic device for generating an avatar and a method thereof.

2. Description of Related Art

An electronic device may provide an avatar that reflects the user's appearance or behavior in virtual reality (VR) or augmented reality (AR). The avatar may be referred to as "AR emoji." The electronic device may display the user's emotional state through the avatar, when the avatar is a personalized character.

The above information is presented as background information only to assist with an understanding of the disclosure. No determination has been made, and no assertion is made, as to whether any of the above might be applicable as prior art with regard to the disclosure.

SUMMARY

In creating the avatars, designers may generate 3-dimension (3D) model data, using a design-dedicated tool. For example, the 3D model data may include character data indicating the appearance of the avatar such as face or body and asset data indicating the costume or accessory worn by the avatar.

For the avatar to be provided in a mobile device such as a smartphone, the 3D model data needs to be converted to a file format capable of being implemented in the mobile device. When the file format used in the design-dedicated tool is different from the file format used in the mobile device, errors may occur when the file format of the 3D model data is converted. When errors are found, the designers may need to modify or regenerate the 3D model data. But doing so inconveniences the designers and the time and cost required to generate the avatar may increase.

Aspects of the disclosure are to address at least the above-mentioned problems and/or disadvantages and to provide at least the advantages described below. Accordingly, an aspect of the disclosure is to provide an electronic device for effectively generating the avatar and a method thereof.

In accordance with an aspect of the disclosure, an electronic device may include a processor and a memory. The memory may store instructions that, when executed, cause the processor to obtain character data indicating an appearance of an avatar, to obtain asset data indicating at least one of a costume or an accessory of the avatar, to generate region information indicating a relationship between a plurality of regions of the appearance of the avatar and a location of at least one of the costume or the accessory, and to store the asset data and the region information in the memory.

In accordance with another aspect of the disclosure, an electronic device may include a display, a wireless communication circuit, a processor, and a memory. The memory may store instructions that, when executed, cause the processor to obtain character data indicating an appearance of an avatar through the wireless communication circuit, to obtain asset data indicating at least one of a costume or an accessory of the avatar, to identify region information indicating a relationship between a plurality of regions of the appearance of the avatar and a location of at least one of the costume or the accessory, and to render the avatar through the display based on the identified region information such that a portion of the plurality of regions that is rendered does not overlap with the costume and the accessory.

In accordance with another aspect of the disclosure, a method of an electronic device may include obtaining character data indicating an appearance of an avatar, obtaining asset data indicating at least one of a costume or an accessory of the avatar, generating region information indicating a relationship between a plurality of regions of the appearance of the avatar and a location of at least one of the costume or the accessory, and storing the asset data and the region information in a memory of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described with reference to accompanying drawings. However, it should be understood that the disclosure is not intended to be limited to a specific embodiment, but intended to include various modifications, equivalents, and/or alternatives of the corresponding embodiment.

Figure 1:
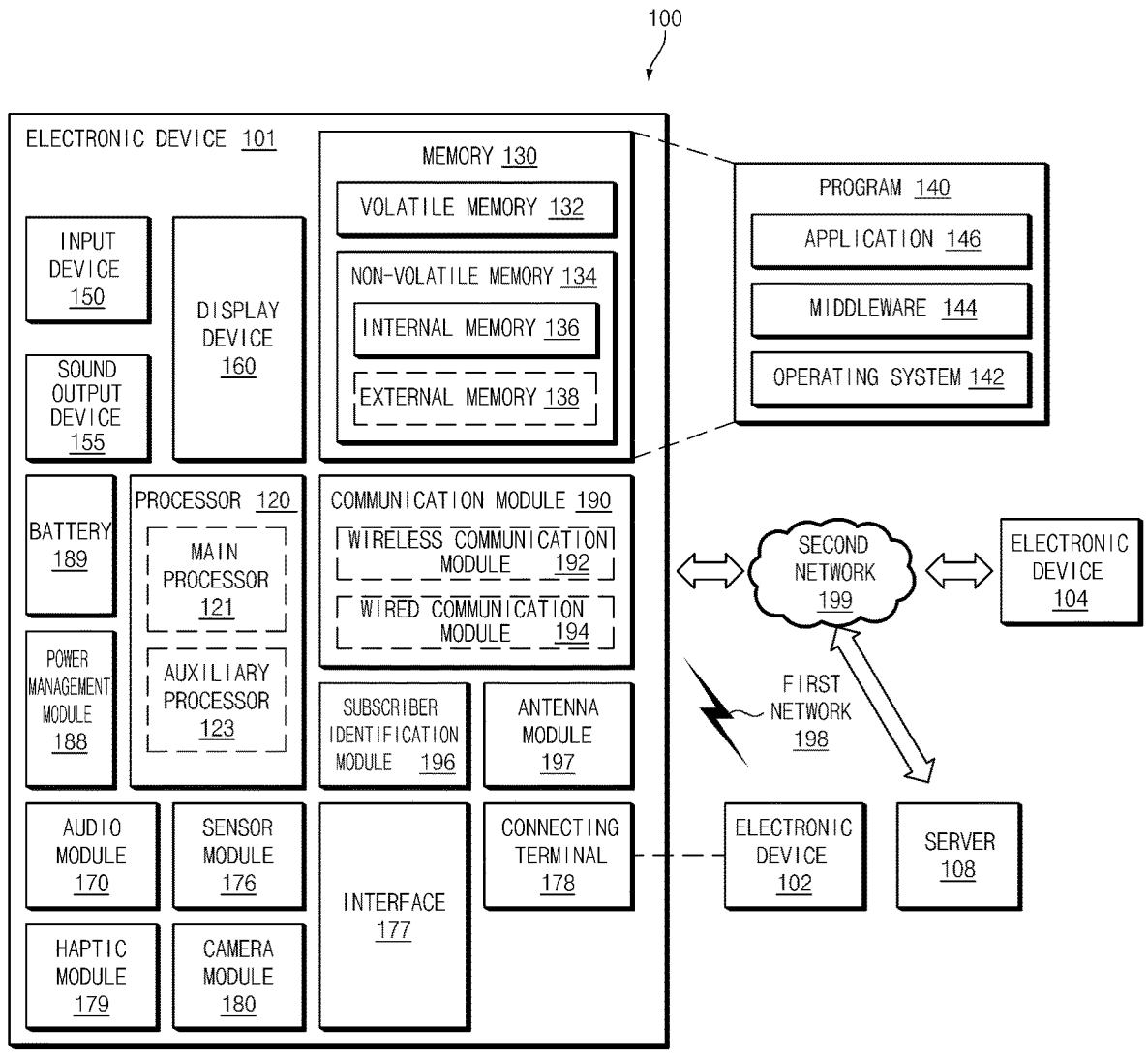
FIG. 1 is a block diagram of an electronic device in a network environment according to various embodiments.

FIG. 1 is a block diagram of an electronic device 101 in a network environment 100, according to various embodiments.

Referring to FIG. 1, an electronic device 101 in a network environment 100 may communicate with an electronic device 102 over a first network 198 (e.g., a short range wireless communication) or may communicate with an electronic device 104 or a server 108 over a second network 199 (e.g., a long range wireless communication). The electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In any embodiment, the electronic device 101 may not include at least one (e.g., the display device 160 or the camera module 180) of the above-described components or may further include one or more other components. In any embodiment, some of the components may be implemented as a single integrated circuit. For example, the sensor module 176 (e.g., a fingerprint sensor, an iris sensor, or an illuminance sensor) may be implemented while being embedded in the display device 160 (e.g., a display).

For example, the processor 120 may execute software (e.g., a program) to control at least another component (e.g., hardware or software component) of the electronic device 101 connected to the processor 120, and may process and calculate various types of data. According to an embodiment, as at least part of data processing or calculation, the processor 120 may load commands or data received from other components (e.g., the sensor module 176 or the communication module 190) into the volatile memory 132, may process instructions or data stored in the volatile memory 132, and may store the result data in the nonvolatile memory 134. According to an embodiment, the processor 120 may include a main processor 121 (e.g., a central processing unit or an application processor) and an auxiliary processor 123 (e.g., a graphic processing unit, an image signal processor, a sensor hub processor, or a communication processor) capable of operating independently or together with the main processor. Additionally or alternatively, the auxiliary processor 123 may use lower power than main processor 121 or may be configured to be specialized to a specified function. The auxiliary processor 123 may be implemented separately from the main processor 121 or as part of the main processor 121.

For example, the auxiliary processor 123 may control at least part of the functions or states associated with at least one (e.g., the display device 160, the sensor module 176, or the communication module 190) of the components of the electronic device 101, instead of the main processor 121 while the main processor 121 is in an inactive (e.g., sleep) state or together with the main processor 121 while the main processor 121 is in an active (e.g., the execution of an application) state. According to an embodiment, the auxiliary processor 123 (e.g., an image signal processor or a communication processor) may be implemented as a part of operatively associated other components (e.g., the camera module 180 or the communication module 190).

The memory 130 may store various pieces of data used by at least one component (e.g., the processor 120 or the sensor module 176) of the electronic device 101. For example, data may include software (e.g., the program 140) and input data or output data for instructions associated with the software. The memory 130 may include, for example, the volatile memory 132 or the nonvolatile memory 134.

The program 140 may be stored as software in the memory 130 and may include, for example, an operating system 142, a middleware 144, or an application 146.

The input device 150 may receive instructions or data to be used for the component (e.g., the processor 120) of electronic device 101, from the outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for a general purpose, such as multimedia play or recording play, and the receiver may be used to receive an incoming call. According to an embodiment, the receiver may be implemented separately from the speaker or may be implemented as a part of the speaker.

The display device 160 may visually provide information to the outside (e.g., the user) of the electronic device 101. The display device 160 may include, for example, a display, a hologram device, or a projector and a control circuit for controlling a corresponding device. According to an embodiment, the display device 160 may include a touch circuitry configured to sense a touch, or a sensor circuitry (e.g., a pressure sensor) configured to measure the strength of force generated by the touch.

The audio module 170 may convert sound to an electrical signal, or reversely, may convert an electrical signal to sound. According to an embodiment, the audio module 170 may obtain sound through the input device 150, or may output sound through the sound output device 155, or through an external electronic device (e.g., the electronic device 102) (e.g., a speaker or a headphone) directly or wirelessly connected with the electronic device 101.

The sensor module 176 may sense an operation state (e.g., power or a temperature) of the electronic device 101 or an external environment state (e.g., a user state), and may generate an electrical signal or a data value corresponding the sensed state. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more specified protocols that may be used to directly and wirelessly connect the electronic device 101 with an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

A connecting terminal 178 may include a connector that may allow the electronic device 101 to be physically connected with an external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal to a mechanical stimulation (e.g., vibration or movement) or an electrical stimulation which the user may perceive through the sense of touch or the sense of movement. According to an embodiment, the haptic module 179 may include, for example, a motor, a piezoelectric sensor, or an electrical stimulation device.

The camera module 180 may photograph a still image and a video. According to an embodiment, the camera module 180 may include one or more lenses, image sensors, image signal processors, or flashes (or electrical flashes).

The power management module 188 may manage the power which is supplied to the electronic device 101. According to an embodiment, the power management module 188 may be implemented, for example, as at least part of a power management integrated circuit (PMIC).

The battery 189 may power at least one component of the electronic device 101. According to an embodiment, the battery 189 may include, for example, a primary cell not rechargeable, a secondary cell rechargeable, or a fuel cell.

The communication module 190 may establish a direct (or wired) communication channel or a wireless communication channel between the electronic device 101 and an external electronic device (e.g., the electronic device 102, the electronic device 104, or the server 108) and may perform communication through the established communication channel. The communication module 190 may include one or more communication processors which are operated independently of the processor 120 (e.g., an application processor) and support direct (or wired) communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). A corresponding communication module of such communication modules may communicate with an external electronic device over the first network 198 (e.g., a short range communication network such as Bluetooth, Wi-Fi direct, or infrared data association (IrDA)) or the second network 199 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 192 may identify and authenticate the electronic device 101 within a communication network, such as the first network 198 or the second network 199, by using subscriber information (e.g., international mobile subscriber identity (IMSI)) stored in the subscriber identification module 196.

The antenna module 197 may transmit a signal or a power to the outside (e.g., an external electronic device) or may receive a signal or a power from the outside. According to an embodiment, the antenna module may include one antenna including a radiator made of a conductor or a conductive pattern formed on a substrate (e.g., a PCB). According to an embodiment, the antenna module 197 may include a plurality of antennas. In this case, at least one antenna suitable for a communication scheme used in a communication network such as the first network 198 or the second network 199 may be selected, for example, by the communication module 190 from the plurality of antennas. The signal or power may be exchanged between the communication module 190 and an external electronic device through the selected at least one antenna or may be received from the external electronic device through the selected at least one antenna and the communication module 190. According to any embodiment, another component (e.g., RFIC) in addition to the radiator may be further formed as the part of the antenna module 197.

At least part of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 101 and the external electronic device 104 through the server 108 connected to the second network 199. Each of the electronic devices 102 and 104 may be a device of which the type is different from or the same as that of the electronic device 101. According to an embodiment, all or a part of operations to be executed in the electronic device 101 may be executed in one or more external devices of the external electronic devices 102, 104, or 108. For example, in the case where the electronic device 101 should perform any function or service automatically or in response to a request from the user or any other device, the electronic device 101 may additionally request one or more external electronic devices to perform at least part of the function or service, instead of internally executing the function or service. The one or more external electronic devices which receive the request may execute at least a part of the function or service thus requested or an additional function or service associated with the request, and may provide a result of the execution to the electronic device 101. The electronic device 101 may process received result as it is or additionally, and may provide a result of the processing as at least a part of the response to the request. To this end, for example, a cloud computing, distributed computing, or client-server computing technology may be used.

Figure 2:
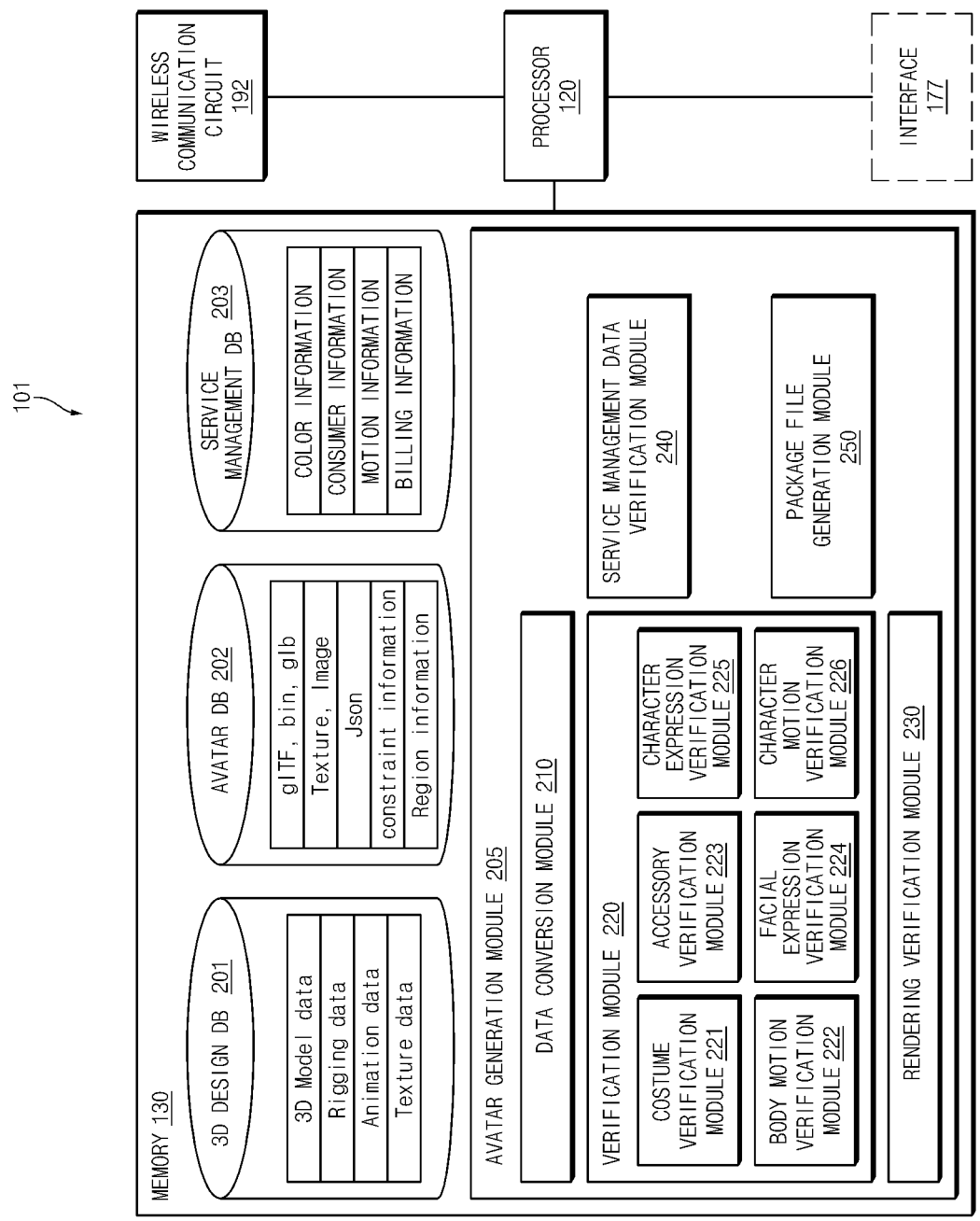
FIG. 2 is a block diagram of an electronic device for generating an avatar, according to an embodiment.

FIG. 2 is a block diagram of an electronic device 101 for generating an avatar, according to an embodiment.

Referring to FIG. 2, the electronic device 101 may be a computing device such as a desktop computer or a laptop or may be a mobile device such as a smartphone or a tablet PC. The electronic device 101 may convert the file format of data such that the avatar generated by a design-dedicated tool is capable of being rendered in the mobile device and then may verify the data of the converted data format. The electronic device 101 may verify the data of the converted file format, using a database (DB) and a module, which are included in a memory 130, and may generate additional information based on the verification result. The additional information may be used such that the avatar is rendered in the mobile device. The electronic device 101 may automatically perform the conversion of the file format of data and the verification of the data, thereby improving the efficiency of the avatar-generation pipeline and reducing lead time.

The electronic device 101 may include the processor 120, the memory 130, and the wireless communication circuit 192 (e.g., the wireless communication module 192 of FIG. 1). Components having the same numerals as the components of the electronic device 100 illustrated in FIG. 1 may perform the same or similar functions as those components. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to another embodiment, the electronic device 101 may further include at least one of the components illustrated in FIG. 1 but not illustrated in FIG. 2. For example, the electronic device 101 may further include a display (e.g., at least part of the display device 160) used to render an avatar.

According to an embodiment, the memory 130 may include a 3D design DB 201, an avatar DB 202, a service management DB 203, and an avatar generation module 205. In this specification, "DB" or "module" may mean a set of instructions stored in the memory 130. For example, the processor 120 may load data (or information) stored in a "DB" or may store data or information in the "DB." For another example, the processor 120 may perform the overall functions of the electronic device 101, such as generating an avatar, by executing instructions forming the "module."

According to an embodiment, the 3D design DB 201 may store the data generated by the design dedicated tool. For example, the file format of the data stored in the 3D design DB 201 may be FBX, which is supported by the design dedicated tool. The 3D design DB 201 may store 3D model data, rigging data, animation data, and texture data. The 3D model data may include character data indicating the appearance such as the face or body of the avatar and asset data indicating the costume or accessory worn by the avatar.

According to an embodiment, the avatar generation module 205 may convert the file format of the data stored in the 3D design DB 201 to the file format required for the mobile device to render the avatar. The avatar generation module 205 may also verify the data of the converted file format. The avatar generation module 205 may verify the converted data and may generate additional information based on the verification result. According to an embodiment, the avatar generation module 205 may include a data conversion module 210, a verification module 220, a rendering verification module 230, a service management data verification module 240, and a package file generation module 250.

According to an embodiment, the data conversion module 210 may convert the file format of data. For example, the converted file format of data may include glTF, bin, or glb, which may be supported by the mobile device. Various processes for converting FBX format to glTF, bin, or glb formats may be known in the art. For example, the data conversion module 210 may generate character data (e.g., hereinafter, referred to as "second character data") that is supported by the mobile device by converting the file attribute of character data (hereinafter, referred to as "first character data") stored in the 3D design DB 201. In another example, the data conversion module 210 may generate asset data (e.g., hereinafter, referred to as "second asset data") that is supported by the mobile device by converting the file attribute of asset data (hereinafter, referred to as "first asset data") stored in the 3D design DB 201.

According to an embodiment, the verification module 220 may verify the data of the converted file format and may generate additional information depending on the verification result. For example, the additional information may include at least one of region information or constraint information. The region information may indicate the relationship between a plurality of regions forming the appearance of the avatar and the location of various objects on the avatar such as costume or accessory. The constraint information may be information for restricting attributes such as the possible motions of the avatar.

According to an embodiment, the verification module 220 may store additional information in the avatar DB 202. For example, the verification module 220 may store the additional information as a part of the second character data or the second asset data. In another example, the verification module 220 may store the additional information as a file separate from the second character data and the second asset data. In this case, the additional information may be stored in a file in the Json format.

According to an embodiment, the verification module 220 may include a costume verification module 221, a body motion verification module 222, an accessory verification module 223, a facial expression verification module 224, a character expression verification module 225, and a character motion verification module 226.

According to an embodiment, the costume verification module 221 may verify whether there is a collision between the character data indicating the appearance of the avatar and the asset data indicating the costume of the avatar. Such a collision may indicate an error where the avatar is rendered while the costume of the avatar overlaps with the skin of the avatar. The costume verification module 221 may prevent this error through the verification. For example, the costume verification module 221 may examine a plurality of regions forming the appearance of the avatar, and detect one of the regions that overlaps with a location of the costume. The costume verification module 221 may generate region information indicating the overlapping region.

According to an embodiment, the body motion verification module 222 may additionally verify the asset data and the character data, after the data are verified by the costume verification module 221. When the animation data indicating the motion of the avatar is applied to the character data, the body motion verification module 222 may verify whether there is a collision between the asset data and the character data. If so, the body motion verification module 222 may generate additional information indicating at least one of a costume type or the animation data, where the collision occurs. In another example, when there is a collision, the body motion verification module 222 may generate constraint information to prevent the animation data to be applied, such that the avatar is not moved. In still another example, the body motion verification module 222 may generate constraint information for restricting the motion ranges of a plurality of joints forming the appearance of the avatar.

According to an embodiment, the accessory verification module 223 may match the avatar's face type, gender, age, or human race indicated by the character data with the avatar's accessory (e.g., glasses, hat, earrings, beard, or hair) indicated by the asset data. For example, the accessory verification module 223 may identify whether a part of the plurality of regions indicating the appearance of the avatar overlaps with the location of the accessory of the avatar.

According to an embodiment, the facial expression verification module 224 may additionally verify the character data and the asset data, after the data are verified by the accessory verification module 223. When the facial expression represented by the character data is changed, the facial expression verification module 224 may verify whether the accessory represented by the asset data is changed depending on the changed facial expression. According to an embodiment, the facial expression represented by the character data may be changed based on a tracking operation by the camera of the electronic device 101 (e.g., the camera module 180 of FIG. 1) or may be changed by applying the animation data to the character data. According to an embodiment, the facial expression verification module 224 may verify the asset data by generating a blendshape or applying a deforming algorithm.

According to an embodiment, the character expression verification module 225 may verify whether the facial expression of the avatar represented by the character data is normal when the facial expression is changed by the animation data generated based on the tracking operation or the blendshape.

According to an embodiment, the character motion verification module 226 may verify whether the avatar would move normally when the animation data indicating the motion of the avatar is applied to the character data. For example, when an error occurs when the animation data for the specified motion is applied to the character data including the specified body type, the character motion verification module 226 may generate additional information indicating at least one of the body type or the animation data, in which the error occurs. In another example, the character motion verification module 226 may generate constraint information to prevent the animation data with an error to be applied, such that the avatar is not moved, to the body type with an error. In still another example, the character motion verification module 226 may generate the constraint information for restricting the motion range of a plurality of joints in the appearance of the avatar.

According to an embodiment, the rendering verification module 230 may verify whether the second character data and the second asset data of the changed file format are rendered correctly. The rendering verification module 230 may generate the additional information indicating the verification result and may store the generated additional information in the avatar DB 202.

According to an embodiment, the service management data verification module 240 may verify and generate information (hereinafter, referred to as "service information") required when an avatar's appearance, costume, or accessory is uploaded to an external server or when the mobile device obtains the avatar's appearance, costume, or accessory from the external server. The service management data verification module 240 may store the service information in the service management DB 203. For example, the service information may be used to verify or generate the avatar's thumbnail, translation functions, color information of costumes or accessories, consumer information (e.g., gender, age, or human race), motion information indicating the motion of costumes or accessories, and billing information. The electronic device 101 may increase the reality of the avatar's appearance, costume, and accessory provided to the user, through the service information.

According to an embodiment, the package file generation module 250 may generate a package file to be uploaded to the external server based on the information stored in the avatar DB 202 and the service management DB 203. For example, the package file may include the file format of an android application package (APK). According to an embodiment, the package file generation module 250 may generate key information (e.g., signing key) for authenticating the package file and an internal folder directory structure of the package file and then may compress the package file.

According to an embodiment, when the electronic device 101 is a computing device such as a desktop computer, the electronic device 101 may further include an interface 177 configured to connect the electronic device 101 to the mobile device. For example, the interface 177 may include USB. When the electronic device 101 is connected to the mobile device before generating the package file, the electronic device 101 may identify whether the data stored in the avatar DB 202 is rendered correctly in the mobile device. According to an embodiment, the electronic device 101 may identify whether the data stored in the avatar DB 202 is rendered correctly using an emulator of the mobile device.

FIGS. 3 to 6 describe an embodiment of generating region information.

Figure 3:
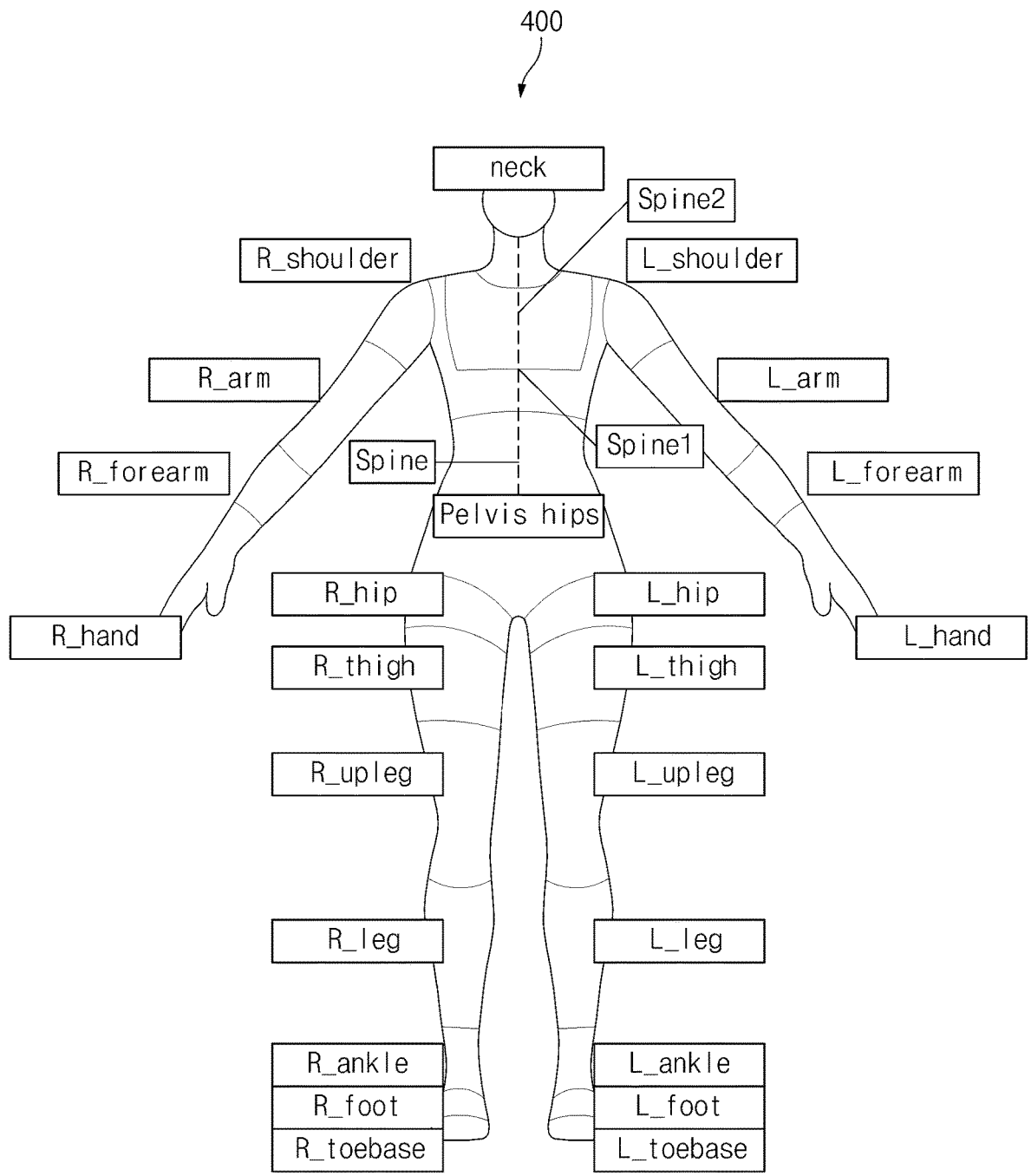
FIG. 3 is a view illustrating a plurality of regions forming an appearance of an avatar, according to an embodiment.

FIG. 3 is a view illustrating a plurality of regions forming an appearance 400 of an avatar, according to an embodiment.

Referring to FIG. 3, character data may indicate a plurality of regions forming the appearance 400 (e.g., body) of the avatar. The plurality of regions may correspond to body portions of the avatar. For example, the plurality of regions may include a neck named neck, a right shoulder R_shoulder, a left shoulder L_shoulder, a right arm R_arm, a left arm L_arm, a right forearm R_forearm, a left forearm L_forearm, a right hand R_hand, a left hand L_hand, a cervical spine spine2, a thoracic spine spine1, a lumbar spine spine, a pelvis hips, a right hip R_hip, a left hip L_hip, a right thigh R_thigh, a left thigh L_thigh, a right upper knee R upleg, a left upper knee L upleg, a right knee Rleg, a left knee Lleg, a right ankle R_ankle, a left ankle L_ankle, a right foot R_foot, a left foot L_foot, a right toe R_toebase, and a left toe L_toebase. Each of the plurality of regions may be referred to as a "segment."

When the asset data indicating the costume of the avatar is applied to the character data indicating the appearance of the avatar, a region overlapping with the costume of the avatar among the plurality of regions forming the appearance of the avatar may be rendered while overlapping with the costume. The electronic device 101 may distinguish the appearance of the avatar into a plurality of regions and may restrict the rendering of regions overlapping with the location of the costume, thereby preventing an error.

Figure 4:
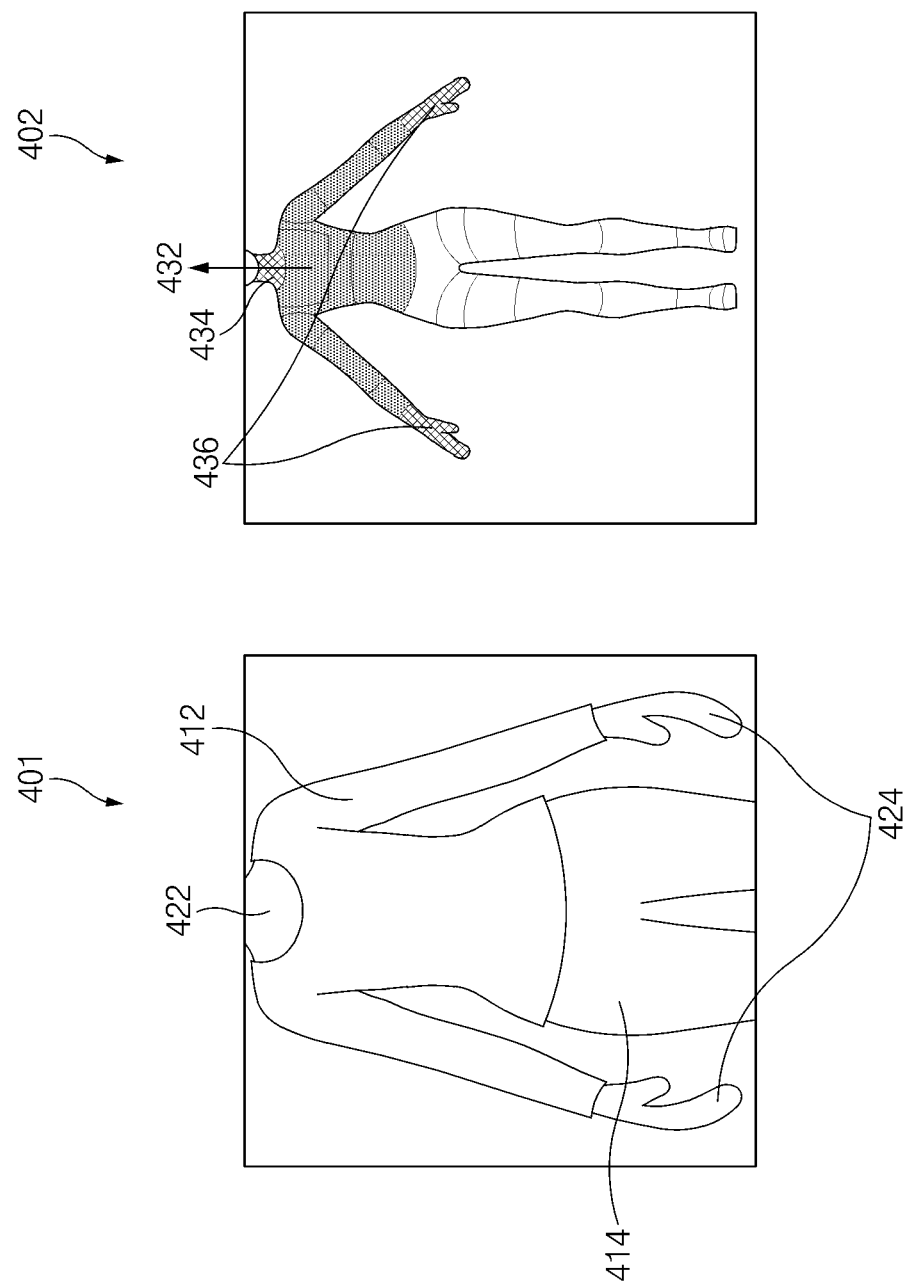
FIG. 4 is a view illustrating an operation of an electronic device generating region information, according to an embodiment.

FIG. 4 is a view illustrating an operation of the electronic device 101 generating region information, according to an embodiment.

Referring to FIG. 4, in the electronic device 101, the asset data may indicate the type of a costume 401 of the avatar and the location where the costume is rendered. For example, the costume 401 may include a top 412 and a bottom 414.

According to an embodiment, the electronic device 101 may identify the relationship between the locations of the top 412 and the bottom 414 and the plurality of regions forming the appearance 402 of the avatar (e.g., the appearance 400 of the avatar of FIG. 3). The electronic device 101 may identify a region overlapping with the location of at least one of the top 412 or the bottom 414. For example, when the avatar wears the top 412, the avatar's neck 422 and both hands 424 may not be obscured by the top 412. The electronic device 101 may identify that the region 434 corresponding to the neck and the region 436 corresponding to both hands do not overlap with the location where the top 412 is rendered. This may be used to indicate that the remaining regions 432 of the upper body of the avatar overlaps with the location where the top 412 is rendered.

In this specification, regions that overlap with where a costume or an accessory is rendered may be referred to as a "first region" (e.g., 432), while the remaining regions other than the first region may be referred to as a "second region" (e.g., 434 or 436). According to an embodiment, the avatar's appearance (e.g., the portion of the body) corresponding to the first region may not be rendered by the mobile device. The avatar's appearance corresponding to the second region may or may not be rendered depending on the costume or the accessory. Alternatively, only parts of the second region may be rendered. According to an embodiment, the second region may be rendered, may not be rendered, or only parts thereof may be rendered based on at least one of the avatar's motion, costume type, or costume shape. For example, when the costume type is a skirt, the portion of the body (e.g. ankle) may or may not be obscured by the skirt depending on the motion of the skirt. In another example, when the costume type is a turtleneck, only a part of the region 434 corresponding to the neck may be rendered while other parts may not be rendered.

According to an embodiment, the electronic device 101 may apply an anti-collision algorithm to the second region (e.g., 434 or 436) or the boundary between the first region (e.g., 432) and the second region (e.g., 434 or 436) to improve the accuracy of the verification.

Figure 5:
FIG. 5 illustrates a list of a plurality of regions, according to an embodiment.

FIG. 5 illustrates a list of a plurality of regions, according to an embodiment.

According to an embodiment, the electronic device 101 may generate region information such that a region of the appearance of the avatar (e.g., 400 in FIG. 3 or 402 in FIG. 4) overlapping with the location of the costume (e.g., 401 of FIG. 4) is not rendered in the mobile device.

For example, referring to FIG. 5, the electronic device 101 may generate region information indicating first regions set to be rendered and second regions (e.g., l_shoulder, r_shoulder, l_forearm, r_forearm, l_thigh, r_thigh, hips, l_hip, and r_hip) set not to be rendered. For convenience of description, FIG. 5 illustrates the first regions and the second regions in the form of a list 500 where check boxes indicate regions that are not rendered. However, the electronic device 101 may generate the region information as a data structure shown in Table 1 below.

TABLE 1

"asset": {
"generator": "FBX2glTF",
"versioin": "2.0",
"extensions": {
"Invisible_bodysegment": [
"l_shoulder_GEO",
"r_shoulder_GEO",
"l_forearm_GEO",
"r_forearm_GEO",
"l_thigh_GEO",
"r_thigh_GEO",
"hips_GEO",
"l_hip_GEO",
"r_hip_GEO"
]
}
}, According to an embodiment, the electronic device 101 may store the region information as a part of the second character data or the second asset data of FIG. 2. For example, when the file format of the second character data or the second asset data is glTF, the electronic device 101 may store the region information as a glTF extension. According to another embodiment, the electronic device 101 may store the region information as a separate file (e.g., Json).

According to an embodiment, the electronic device 101 may identify the costume type (e.g., tops, bottoms, dresses, or shoes) based on the second regions that are indicated by the region information to be not rendered. The electronic device 101 may detect errors by comparing the costume type identified based on the region information with the costume type indicated by the asset data.

Figure 6:
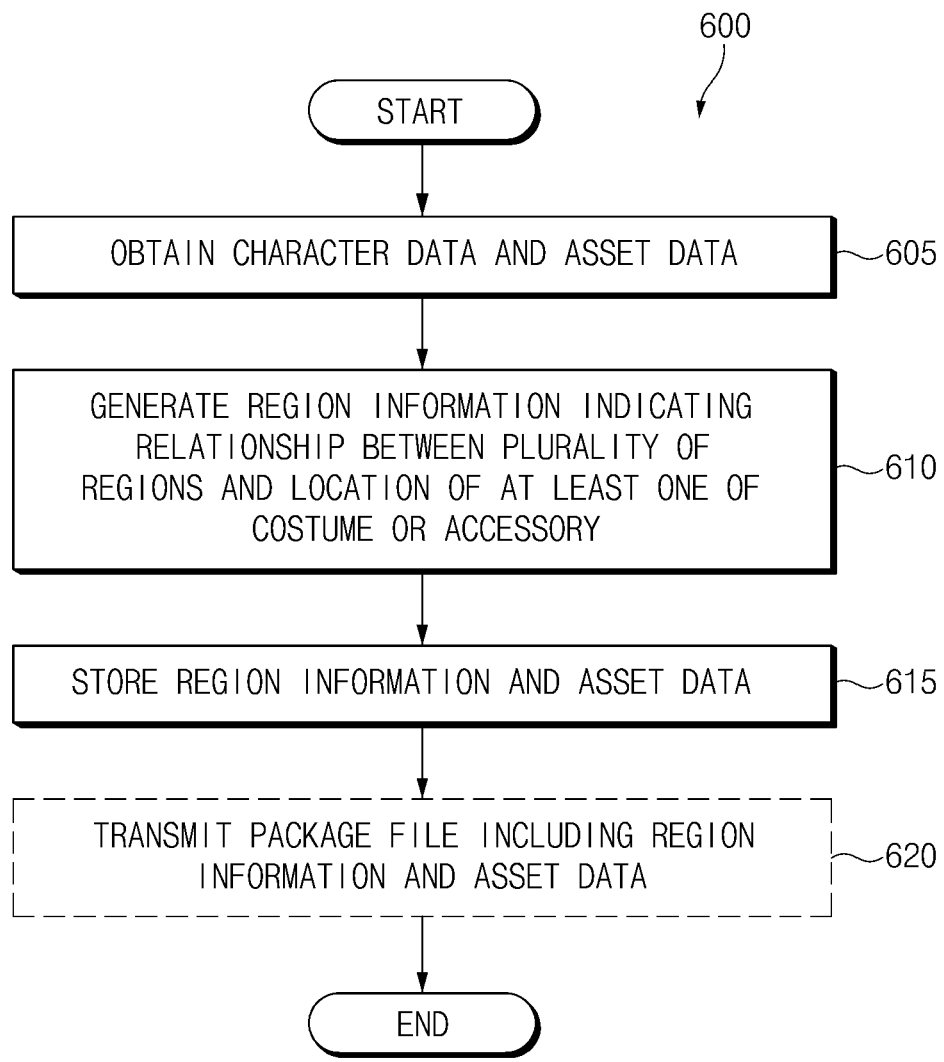
FIG. 6 illustrates an operation flowchart of an electronic device generating region information, according to an embodiment.

FIG. 6 illustrates an operation flowchart 600 of an electronic device generating region information, according to an embodiment. The operations illustrated in FIG. 6 may be performed by an electronic device (e.g., the electronic device 101 of FIG. 1). Alternatively, the component (e.g., the processor 120) of the electronic device may execute instructions, and thus the operations may be performed.

Referring to FIG. 6, in operation 605, the electronic device may obtain character data and asset data. For example, the electronic device may receive a user input to store character data (e.g., first character data) and asset data (e.g., first asset data) generated by a design dedicated tool, and to convert the file formats of the stored character data and the stored asset data in order to obtain character data (e.g., second character data) and asset data (e.g., second asset data) that are supported by the mobile device. The character data may indicate the appearance of the avatar (e.g. at least one of a face or a body), and the asset data may indicate at least one of the costume or accessory worn by the avatar.

In operation 610, the electronic device may generate region information indicating relationships between a plurality of regions of the appearance of the avatar and the locations of costumes or accessories indicated by the asset data. For example, the electronic device may identify a first region, which overlaps with the location of at least one of the costume or the accessory, and a second region different from the first region. The electronic device may generate the region information indicating the first region and the second region.

In operation 615, the electronic device may store the region information and the asset data in the memory 130 (e.g., the avatar DB 202 of FIG. 2). According to an embodiment, the electronic device 101 may store the region information as a part of the asset data or may store the region information as a separate file.

According to an embodiment, the electronic device may additionally perform operation 620. In operation 620, the electronic device may transmit a package file including the region information and the asset data to an external device, such as an external server. The external server may include a server (e.g., app store) for providing the package file to other mobile devices. In another example, the electronic device may transmit the package file to a mobile device to allow the user of the mobile device to generate and edit the avatar. In another example, the electronic device may transmit the package file to the external server after transmitting the package file to the mobile device. According to an embodiment, the processor 120 may transmit the package file to the external device through the wireless communication circuit 192.

Figure 7:
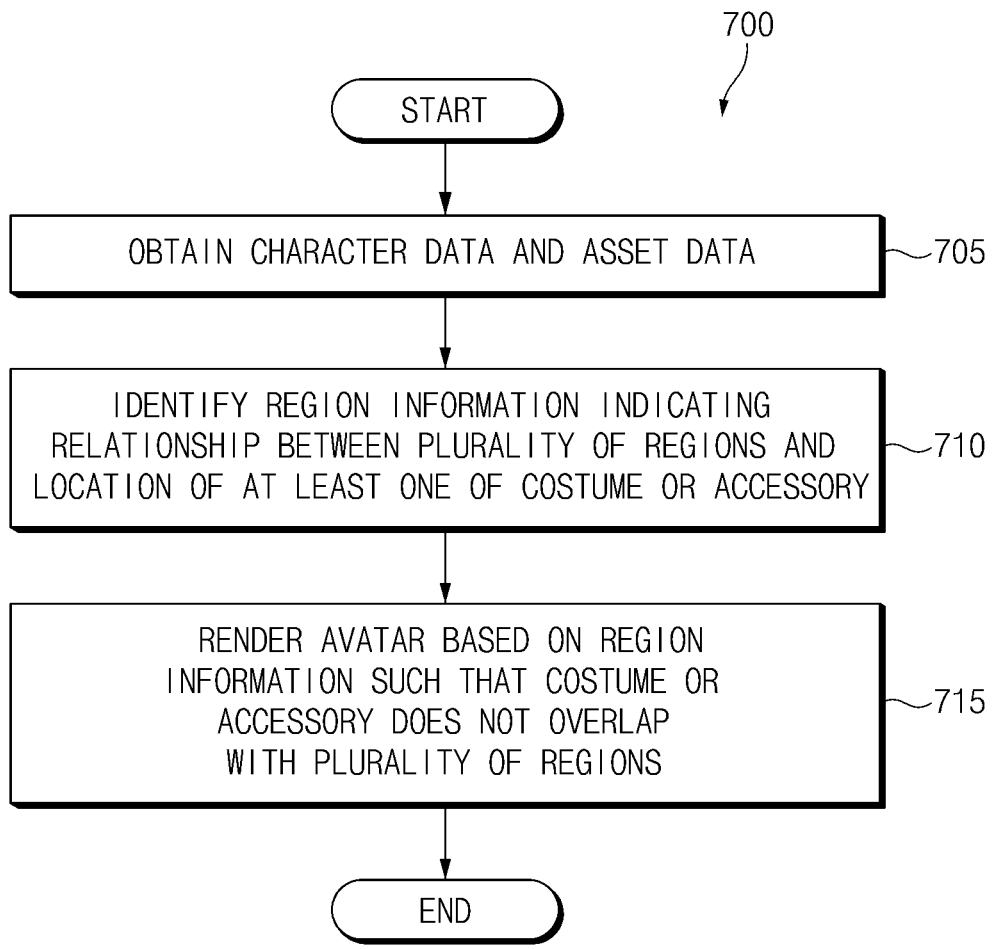
FIG. 7 illustrates an operation flowchart of an electronic device rendering an avatar, according to an embodiment.

FIG. 7 illustrates an operation flowchart 700 of an electronic device rendering an avatar, according to an embodiment. The operations illustrated in FIG. 7 may be performed by an electronic device (e.g., the electronic device 101 of FIG. 1). Alternatively, the component (e.g., the processor 120) of the electronic device may execute instructions, and thus the operations may be performed. The electronic device performing the operation of FIG. 7 may be an entity the same as or different from the electronic device generating the avatar according to FIG. 6.

Referring to FIG. 7, in operation 705, the electronic device may obtain character data and asset data. For example, the electronic device may download a package file including the character data and the asset data from an external server through a wireless communication circuit (e.g., 192 of FIG. 2). The package file may be generated based on the operations illustrated in FIG. 6.

In operation 710, electronic device may identify region information indicating the relationship between a plurality of regions forming the appearance of the avatar and locations of costumes and/or accessories. According to an embodiment, the region information may be included in the asset data or may be included as a separate file in the package file.

In operation 715, the electronic device may render the avatar based on the identified region information such that the costume or accessory does not overlap with the plurality of regions. For example, referring to FIG. 4, the processor 120 may render the regions 434 and 436, which do not overlap with the top 412, via a display (e.g., the display device 160 of FIG. 1) and may not render the region 432 overlapping with the top 412.

Figure 8:
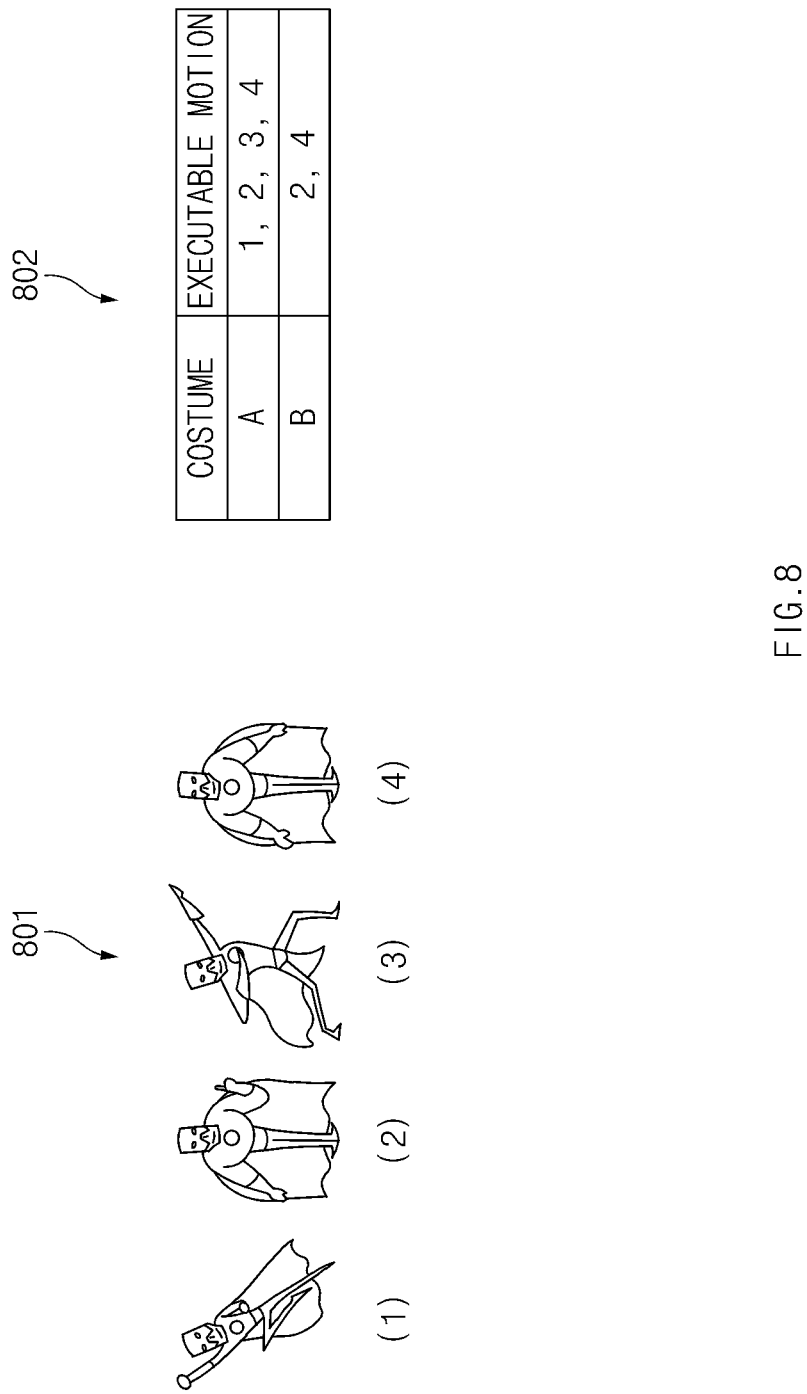
FIG. 8 illustrates constraint information indicating a relationship between a plurality of motion types and a costume type of an avatar, according to an embodiment.
Figure 9:
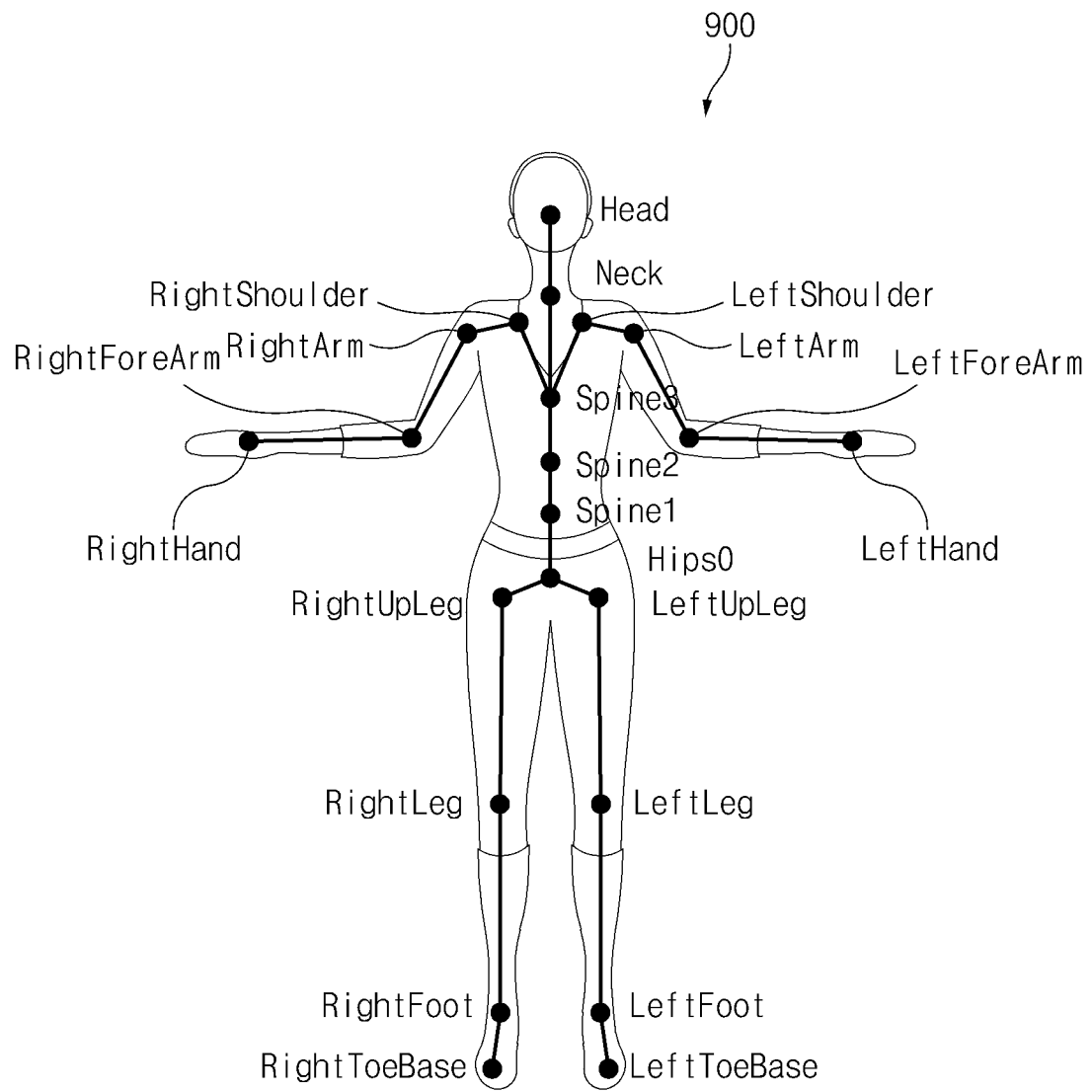
FIG. 9 is a view illustrating a plurality of joints associated with motion of an avatar, according to an embodiment.
Figure 10:
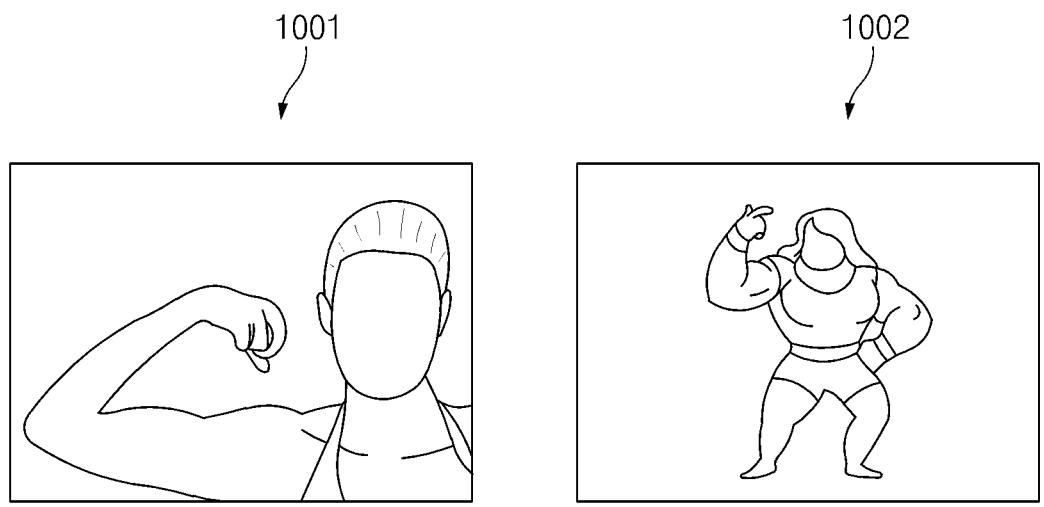
FIG. 10 illustrates body types of an avatar, according to an embodiment.

FIGS. 8 to 10 illustrate an embodiment of generating constraint information.

FIG. 8 illustrates constraint information 802 indicating a relationship between a plurality of motion types 801 and a costume type of an avatar, according to an embodiment.

Referring to FIG. 8, the electronic device 101 may select one of the plurality of motion types (1), (2), (3), and (4) identified by animation data depending on the costume type (e.g., A or B) of the avatar identified by the asset data. The motion types may identify specific actions of the avatar.

According to an embodiment, the electronic device 101 (e.g., the body motion verification module 222 of FIG. 2) may select the motion type by matching the costume type and the motion types. For example, the electronic device 101 may identify whether the avatar is capable of moving in a specified motion type while wearing a specified costume.

For example, when the costume type is A (e.g. a sweat suit), the sweat suit A may not restrict any motion type, and thus the electronic device 101 may determine that all of the plurality of motion types (1), (2), (3), and (4) are matched with the sweat suit A. In this case, the electronic device 101 may select all or any one of the plurality of motion types (1), (2), (3), and (4). In another example, when the costume type is B (e.g. a skirt), the avatar may not raise or widen his/her legs while wearing the skirt B, and thus the electronic device 101 may determine that some motion types (1) and (3) are not matched with the skirt B. In this case, the electronic device 101 may select motion types (2) and (4) to be matched with the skirt B. The electronic device 101 may generate constraint information 802 (e.g., look-up table) indicating the relationship between the motion types and the costume type, based on the matching result.

According to an embodiment, the electronic device 101 may store the constraint information 802 in the memory 130 (e.g., the avatar DB 202 of FIG. 2). For example, the electronic device 101 may store the constraint information 802 as a part of the asset data or as a separate file.

FIG. 9 is a view illustrating a plurality of joints 900 associated with motion of an avatar, according to an embodiment.

Referring to FIG. 9, in addition to selecting a motion type based on costume type, the electronic device 101 may determine the motion ranges of a plurality of joints identified by rigging data.

According to an embodiment, the rigging data may indicate a plurality of joints forming the avatar's skeleton. The plurality of joints may be body parts that are required for the avatar to move. For example, the plurality of joints may include a head named Head, a neck Neck, a right shoulder RightShoulder, a left shoulder LeftShoulder, a right arm RightArm, a left arm LeftArm, a right forearm RightForeArm, a left forearm LeftForeArm, a right hand RightHand, a left hand LeftHand, a cervical spine Spine3, a thoracic spine Spine2, a lumbar spine Spine1, a pelvis Hips0, a right upper knee RightUpLeg, a left upper knee LeftUpLeg, a right knee RightLeg, a left knee LeftLeg, a right foot RightFoot, a left foot LeftFoot, a right toe RightToeBase, and a left toe LeftToeBase.

According to an embodiment, the electronic device 101 may restrict the motion ranges of the joints based on the costume type. For example because the avatar is restricted from widening the avatar's legs when the costume type is skirt, the electronic device 101 may set the motion range of each of the right upper knee RightUpLeg, the left upper knee LeftUpLeg, the right knee RightLeg, and the left knee LeftLeg to be less than the default value.

According to an embodiment, the electronic device 101 may generate constraint information indicating the motion ranges of joints and then may store the generated constraint information in the memory 130 (e.g., the avatar DB 202 of FIG. 2).

FIG. 10 illustrates body types 1001 and 1002 of an avatar, according to an embodiment.

Referring to FIG. 10, the electronic device 101 may generate constraint information based on the body type of the avatar identified by the character data, in addition to the costume type. For example, the body type may include a first body type 1001 indicating a thin body and a second body type 1002 indicating a muscular body. In the first body type 1001, the angle at which the arm of the avatar is bent inwardly is greater than the corresponding angle of the second body type 1002. Due to this, the electronic device 101 may set the motion range of the right arm RightArm and the left arm LeftArm of the second body type 1002 to be less than the motion range of the right arm RightArm and the left arm LeftArm of the first body type 1001. The electronic device 101 may generate the constraint information including the motion ranges of the first body type 1001 and the second body type 1002. For example, the constraint information may be stored as a data structure shown in Table 2 below.

TABLE 2

```
{
    "versioin": 1,
    "name": 1,
    "motion_constraint": {
    "right_arm_JNT": [85.0, 240.0, 30.0],
    "left_arm_JNT": [-85.0, 240.0, 30.0],
    }
}
```

Figure 11A:
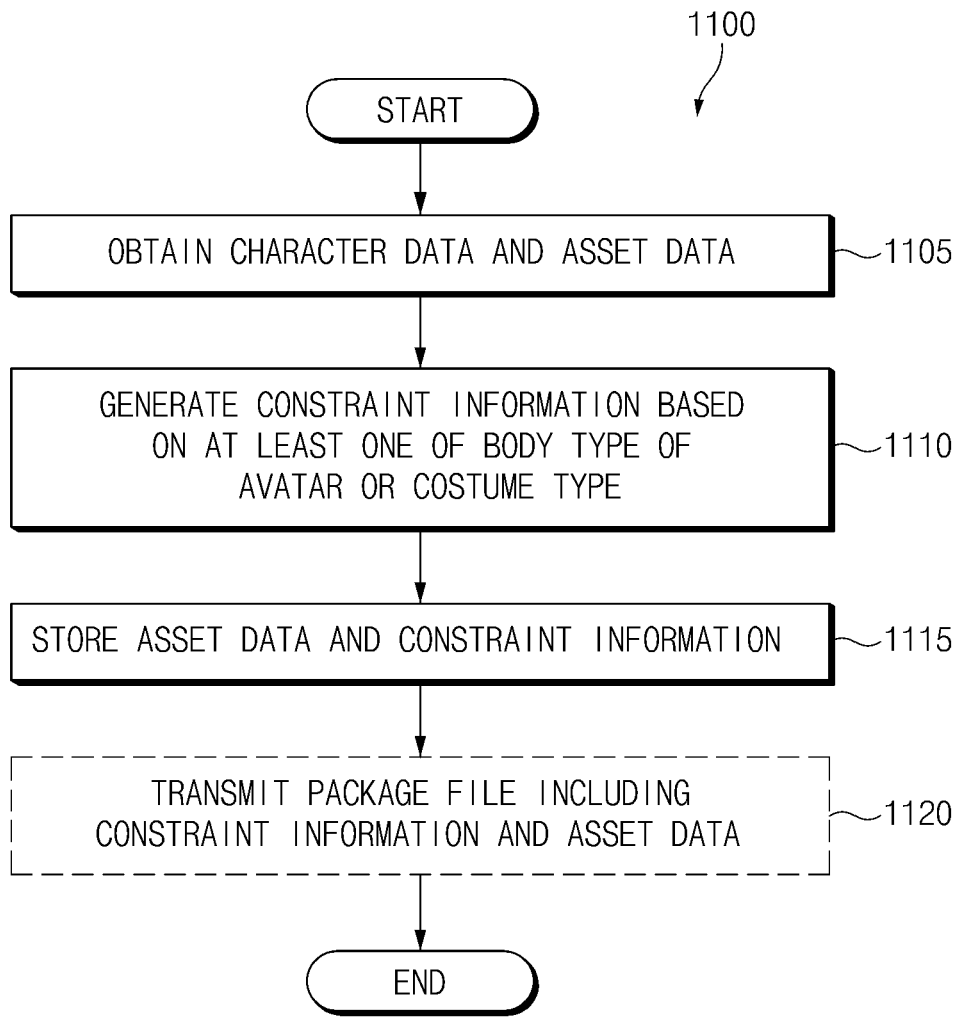
FIG. 11A illustrates an operation flowchart of an electronic device generating constraint information, according to an embodiment.

FIG. 11A illustrates an operation flowchart 1100 of an electronic device generating constraint information, according to an embodiment. The operations illustrated in FIG. 11A may be performed by an electronic device (e.g., the electronic device 101 of FIG. 1). Alternatively, the component (e.g., the processor 120) of the electronic device may execute instructions and thus the operations may be performed. The electronic device may perform the operations illustrated in FIG. 11A after operation 615 of FIG. 6 or may be performed independently of the operation flowchart 600 of FIG. 6.

Referring to FIG. 11A, in operation 1105, the electronic device may obtain character data and asset data. For example, the electronic device may receive a user input to store character data (e.g., first character data) and asset data (e.g., first asset data) generated by a design dedicated tool, and to convert the file formats of the stored character data and the stored asset data in order to obtain character data (e.g., second character data) and asset data (e.g., second asset data) that are supported by the mobile device. The character data may indicate the appearance of the avatar (e.g. at least one of a face or a body). The asset data may indicate at least one of the costume or accessory worn by the avatar.

In operation 1110, the electronic device may generate constraint information based on at least one of the body type of the avatar identified by the character data or the costume type identified by the asset data. For example, when animation data includes a plurality of motion types, the electronic device may select a motion type corresponding to a costume type (or body type) by matching the plurality of motion types with a costume type (or body type). In another example, the electronic device may set the motion range of a plurality of joints based on the costume type (or body type). The electronic device may generate constraint information indicating the motion range of each of the joints or the selected motion type.

In operation 1115, the electronic device may store the constraint information and the asset data in the memory 130 (e.g., the avatar DB 202 of FIG. 2). According to an embodiment, the electronic device 101 may store the constraint information as a part of the asset data or may store the region information as a separate file.

According to an embodiment, the electronic device may additionally perform operation 1120. In operation 1120, the electronic device may transmit a package file including the constraint information and the asset data to an external device, such as an external server or a mobile device. In another example, the electronic device may transmit the package file to the external server after transmitting the package file to the mobile device. According to an embodiment, the processor 120 may transmit the package file to the external device through the wireless communication circuit 192.

Figure 11B:
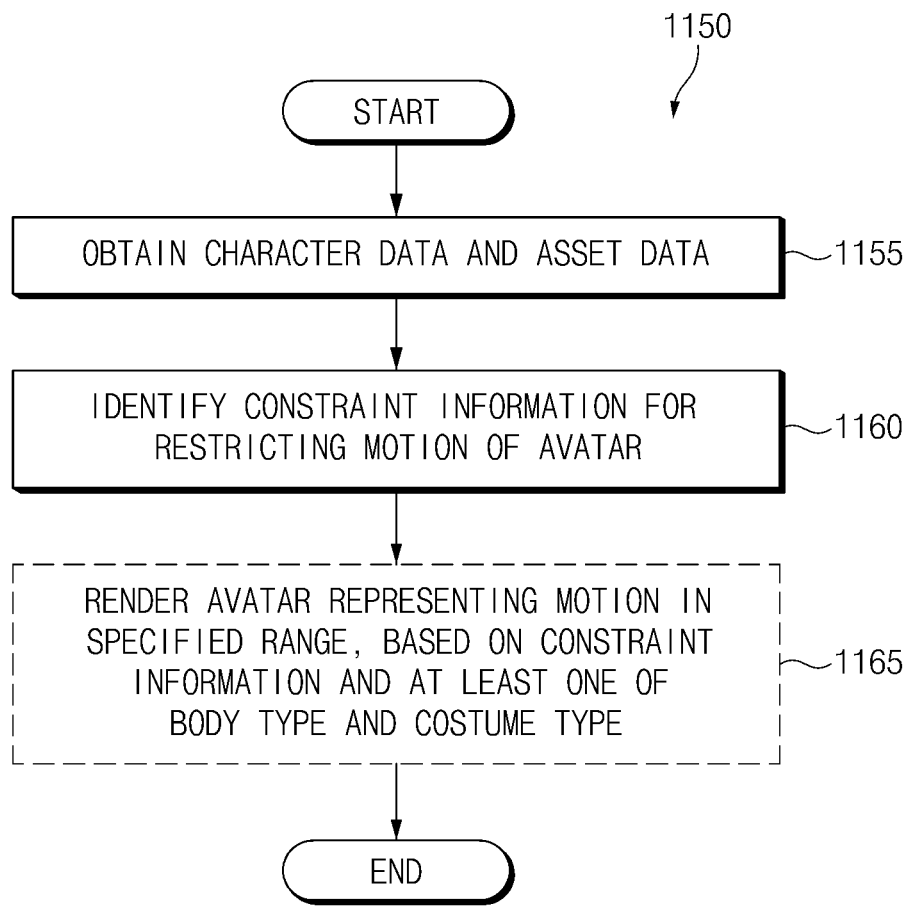
FIG. 11B illustrates an operation flowchart of an electronic device rendering an avatar representing the motion in a specified range, according to an embodiment.

FIG. 11B illustrates an operation flowchart 1155 of an electronic device rendering an avatar representing the motion in a specified range, according to an embodiment. The operations illustrated in FIG. 11B may be performed by an electronic device (e.g., the electronic device 101 of FIG. 1). Alternatively, the component (e.g., the processor 120) of the electronic device may execute instructions and thus the operations may be performed. The electronic device performing the operation of FIG. 11B may be an entity the same as or different from the electronic device generating the constraint information depending on FIG. 11A. The operations of FIG. 11B may be performed after operation 715 of FIG. 7 or may be performed independently of the operation flowchart 700.

Referring to FIG. 11B, in operation 1155, the electronic device may obtain character data and asset data. For example, the electronic device may download a package file including the character data and the asset data from an external server through a wireless communication circuit (e.g., 192 of FIG. 2). The package file may be generated based on the operations illustrated in FIG. 11A.

In operation 1160, the electronic device may identify constraint information for restricting the motion of the avatar. For example, the constraint information may indicate at least one of the relationship between a costume type and a motion type, the relationship between a body type and a motion type, a motion range of each of joints corresponding to the costume type, stored as rigging data, or a motion range of each of joints corresponding to the body type.

In operation 1165, the electronic device may render the avatar representing the motion in a specified range, based on the constraint information and at least one of the body type indicating character data and the costume type indicating asset data.

Figure 12:
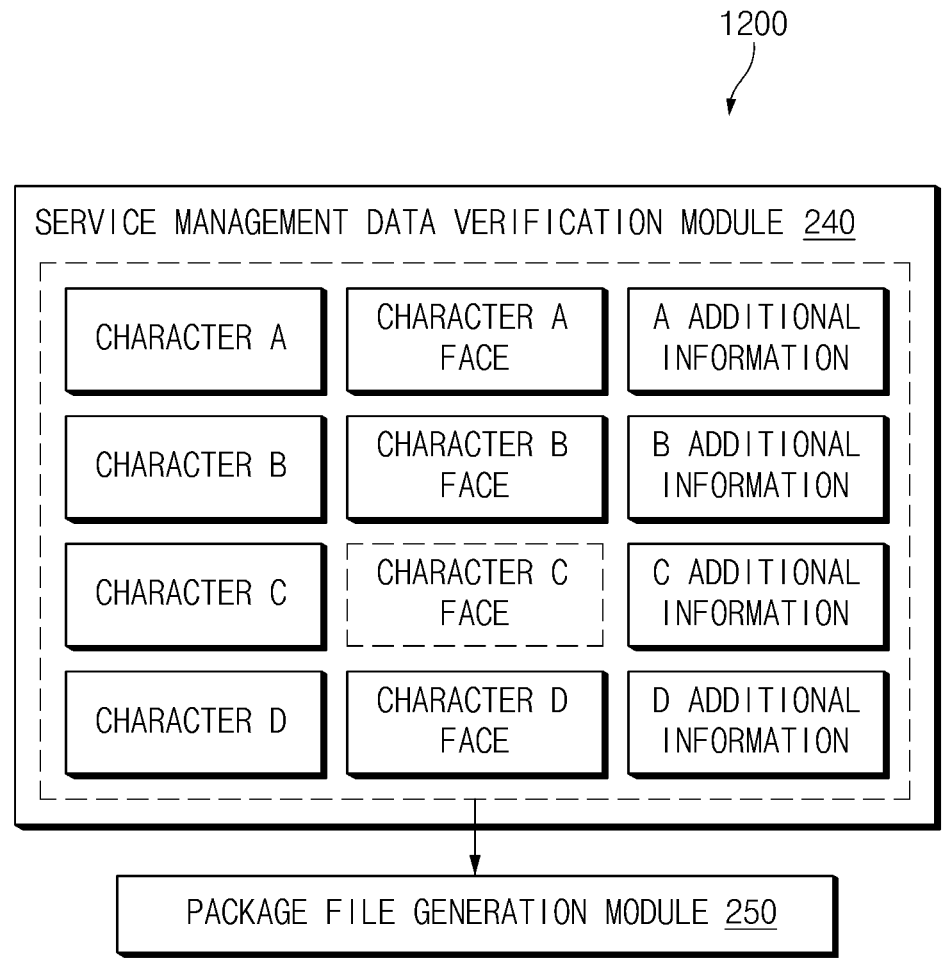
FIG. 12 illustrates an operation of an electronic device generating a package file, according to an embodiment.
Figure 13:
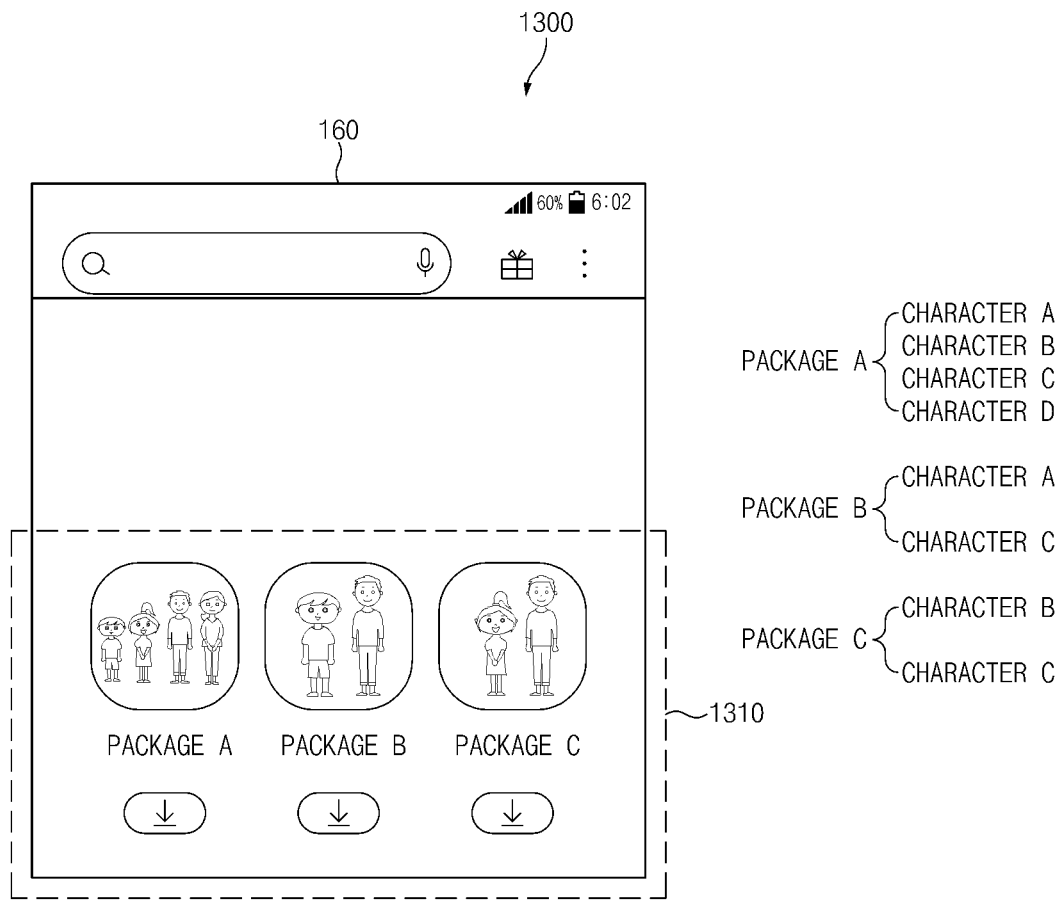
FIG. 13 illustrates a user interface (UI) for obtaining a package file including a plurality of avatars, according to an embodiment.

FIGS. 12 to 14 illustrate an embodiment of generating or editing a package file.

FIG. 12 illustrates an operation flowchart 1200 of generating a package file, according to an embodiment.

Referring to FIG. 12, the service management data verification module 240 may generate avatar data based on character data and asset data. The avatar data may include at least one of full body data (e.g., character A, character B, character C, or character D) for the render of the full body of the avatar, face data (e.g., character A Face, character B Face, character C Face, or character D Face) for the render of only the face of the avatar, and additional information (e.g., A additional information, B additional information, C additional information, or D additional information). For example, the additional information may include at least one of region information, constraint information, or service information.

According to an embodiment, the package file generation module 250 may package pieces of avatar data for a plurality of avatars (e.g., A, B, C, and D) as a single package file, thereby improving the convenience of data management. The electronic device 101 may transmit the package file including the pieces of avatar data to an external server through the wireless communication circuit 192.

FIG. 13 illustrates a user interface (UI) 1300 for obtaining a package file, according to an embodiment.

Referring to FIG. 13, an electronic device receiving an avatar may output a UI 1310 for obtaining a package file (e.g., A, B, or C) including a plurality of avatars, through the display 160. When a user input to download a package file through the UI 1310 is received, the electronic device may download the package file (e.g., A, B, or C) including the plurality of avatars (e.g., at least one of character A, character B, character C, or character D) from an external server. The electronic device downloading the avatar may provide the user with the plurality of avatars by downloading a single package file. This way, the electronic device may provide a UI to allow the user to select a package including avatars desired by a user.

FIGS. 14A to 14D illustrate a UI for editing a package file, according to an embodiment.

According to an embodiment, the electronic device 101 may provide the user (e.g., a designer) with the convenience of avatar generation, through a UI for generating a package file. Screens 1401, 1402, 1403, and 1404 illustrated in FIGS. 14A to 14D may be output through the display of the electronic device 101. Furthermore, the order and placement of the screens 1401, 1402, 1403, and 1404 are not limited to the embodiment illustrated in FIGS. 14A to 14D.

Figure 14A:
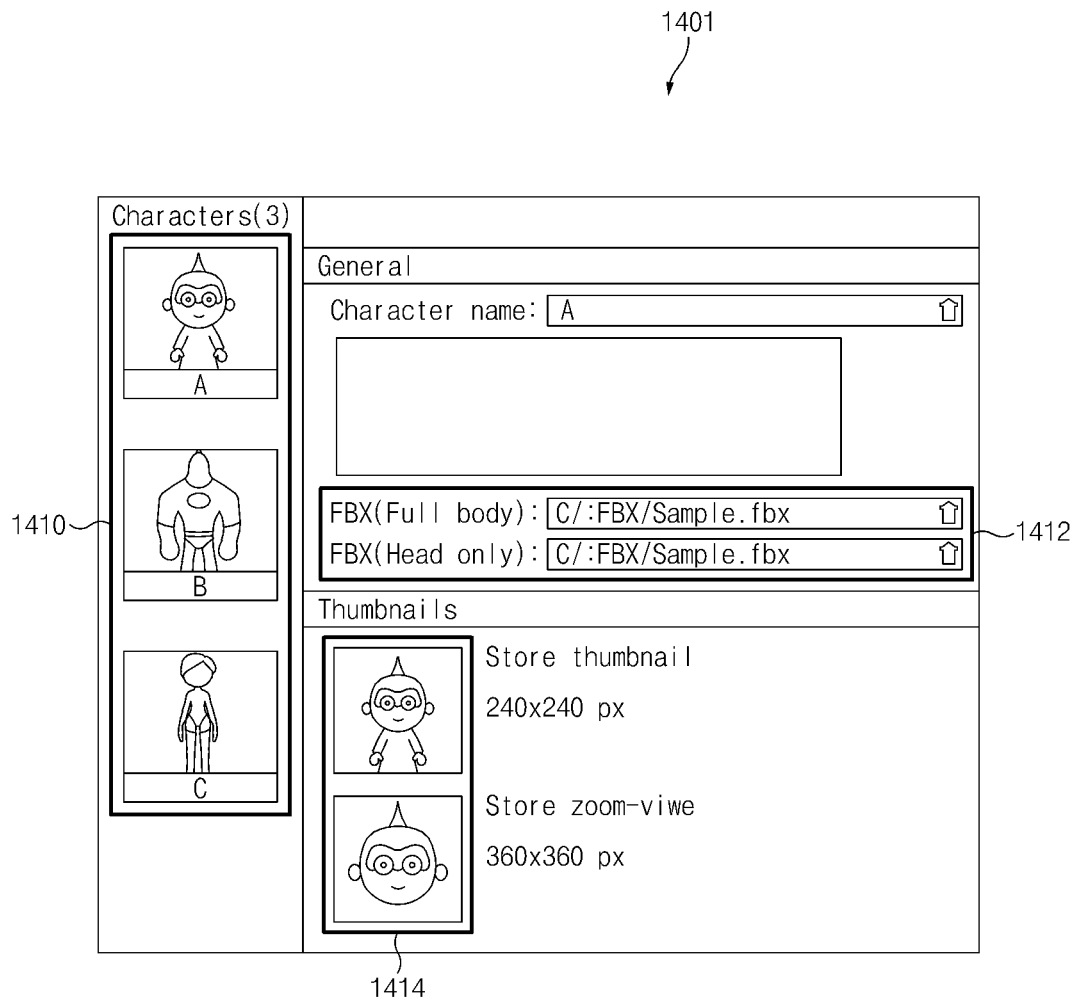
FIG. 14A illustrates a UI for editing a package file, according to an embodiment.

Referring to FIG. 14A, the electronic device 101 may output the first screen 1401 including the first UI 1410 capable of selecting a plurality of avatars A, B, and C, a second UI 1412 indicating a storage path capable of storing avatar data, and a third UI 1414 indicating a thumbnail image of the selected avatar. The user may edit at least one of the types, number, or thumbnail images of avatars included in the package file through the output UIs 1410, 1412, and 1414 and then may store the edited data.

Figure 14B:
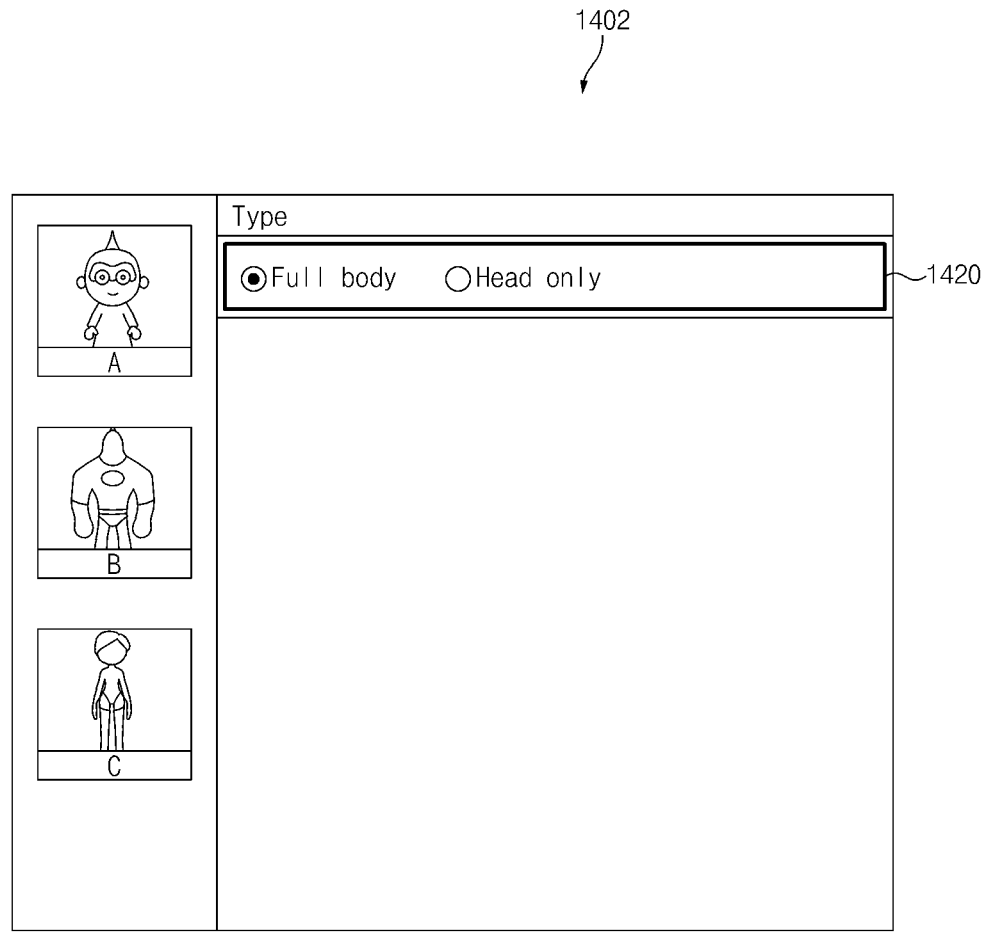
FIG. 14B illustrates another UI for editing a package file, according to an embodiment.

Referring to FIG. 14B, the electronic device 101 may output the second screen 1402 including a fourth UI 1420 for determining the type (e.g., full body or face) of the avatar data provided to the user. FIG. 14B illustrates an embodiment of selecting either full body or face only. However, according to other embodiments, the electronic device 101 may separately generate data for the full body and data for the face in response to a user input to select both the full body and the face. Through the above-described method, the electronic device 101 may provide the avatar of the type desired by the user.

Figure 14C:
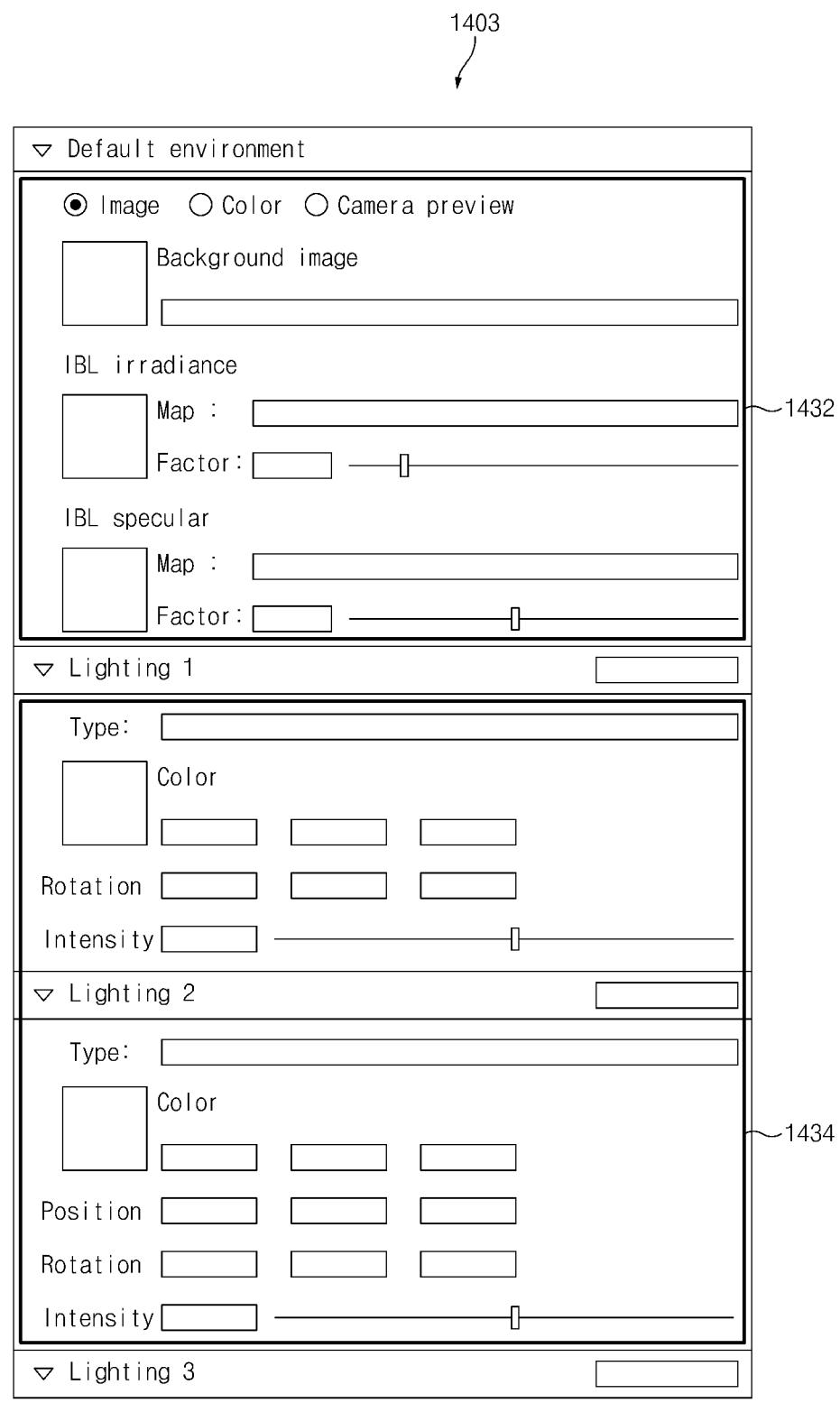
FIG. 14C illustrates still another UI for editing a package file, according to an embodiment.

Referring to FIG. 14C, the electronic device 101 may output the third screen 1403 including a fifth UI 1432 for editing the background image of the avatar and a sixth UI 1434 for editing the lighting information of the avatar.

Figure 14D:
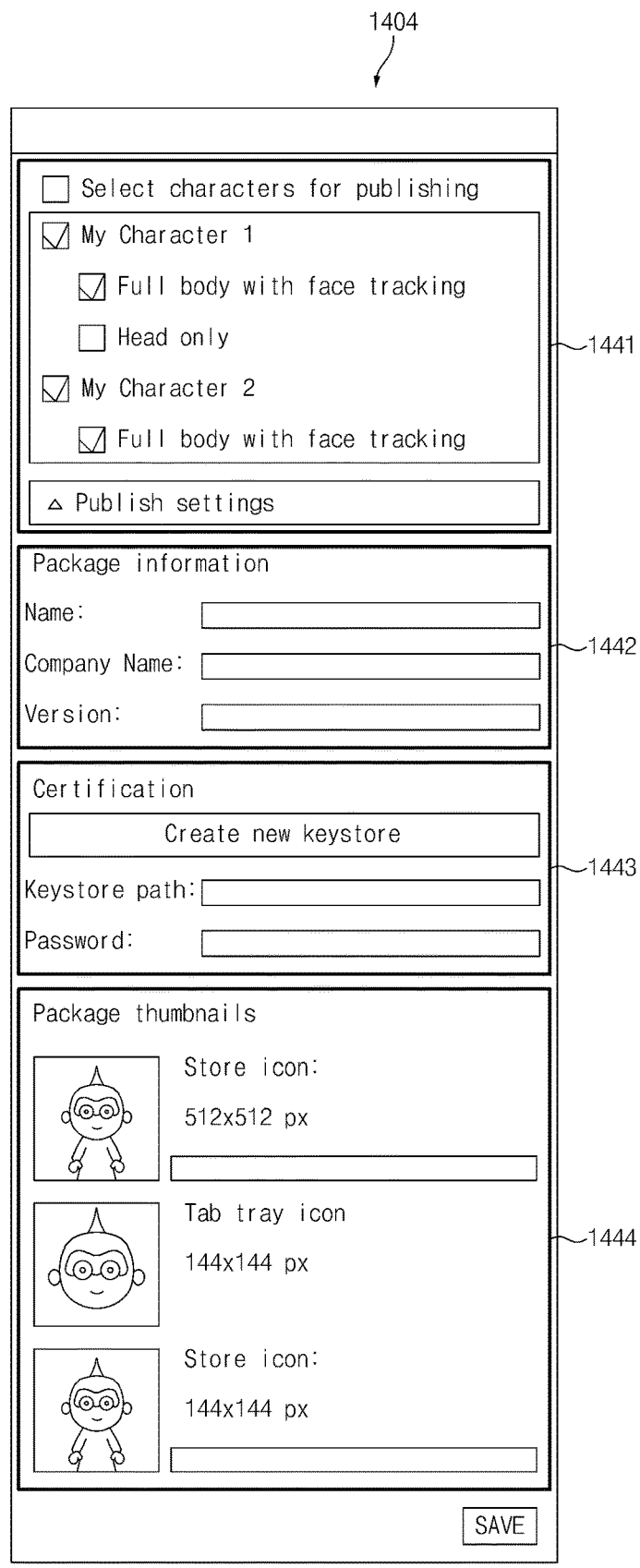
FIG. 14D illustrates yet another UI for editing a package file, according to an embodiment.

Referring to FIG. 14D, the electronic device 101 may output the fourth screen 1404 including a seventh UI 1441 for editing the type of avatar data provided for each avatar, an eighth UI 1442 for editing additional information (e.g., the name, the manufacturer, and version of an avatar), a ninth UI 1443 for editing key information for authenticating the package file, and a tenth UI 1444 for editing thumbnail images of the avatar.

As described above, an electronic device (e.g., 101 of FIG. 2) may include a processor (e.g., 120 of FIG. 2) and a memory (e.g., 130 of FIG. 2). The memory may store instructions that, when executed, cause the processor to obtain character data indicating an appearance of an avatar, to obtain asset data indicating at least one of a costume or an accessory of the avatar, to generate region information indicating a relationship between a plurality of regions of the appearance of the avatar and a location of at least one of the costume or the accessory, and to store the asset data and the region information in the memory.

According to an embodiment, the instructions may cause the processor to store the region information as a part of the asset data or to store the region information as a file separate from the asset data.

According to an embodiment, the instructions may cause the processor to identify a first region overlapping with at least one of the costume or the accessory in the plurality of regions, to identify a second region different from the first region in the plurality of regions, and to generate the region information to indicate the first region and the second region.

According to an embodiment, the instructions may cause the processor to obtain first character data and first asset data generated by a design dedicated tool, to convert the first character data to the character data configured to be rendered by a mobile device, and to convert the first asset data to the asset data configured to be rendered in the mobile device.

According to an embodiment, the electronic device may further include a wireless communication circuit configured to perform wireless communication with an external server. The instructions may cause the processor to generate a package file including the character data, the asset data, and the region information and to transmit the package file to the external server through the wireless communication circuit.

According to an embodiment, the instructions may cause the processor to identify a costume type included in the asset data or a body type of the avatar included in the character data, to generate constraint information for restricting a motion of the avatar based on the costume type or the body type, and to store the constraint information in the memory.

According to an embodiment, the instructions may cause the processor to identify a first motion type matched with the costume type or the body type among a plurality of specified motion types, to identify a second motion type not matched with the costume type or the body type among the plurality of specified motion types, and to generate the constraint information to indicate the first motion type and the second motion type.

According to an embodiment, the instructions may cause the processor to identify a plurality of joints forming the appearance of the avatar, to set a motion range of each of the plurality of joints, based on the identified costume type or the identified body type, and to generate the constraint information to include the set motion range.

As described above, an electronic device (e.g., 101 of FIG. 2) may include a display (e.g., at least part of the display device 160), a wireless communication circuit (e.g., 192 of FIG. 2), a processor (e.g., 120 of FIG. 2), and a memory (e.g., 130 of FIG. 2). The memory may store instructions that, when executed, cause the processor to obtain character data indicating an appearance of an avatar through the wireless communication circuit, to obtain asset data indicating at least one of a costume or an accessory of the avatar, to identify region information indicating a relationship between a plurality of regions of the appearance of the avatar and a location of at least one of the costume or the accessory, and to render the avatar through the display based on the identified region information such that a portion of the plurality of regions that is rendered does not overlap with the costume and the accessory.

According to an embodiment, the region information is included in the asset data or a file separate from the asset data.

According to an embodiment, the instructions may cause the processor to identify a first region overlapping with at least one of the costume or the accessory in the plurality of regions and to identify a second region different from the first region in the plurality of regions. The first region may be rendered based on the asset data, and the second region may be rendered based on the character data.

According to an embodiment, the instructions may cause the processor to obtain constraint information for restricting a motion of the avatar, through the wireless communication circuit, and to render the avatar with motion of a specified range, based on the constraint information and at least one of a body type of the avatar included in the character data or a costume type included in the asset data.

According to an embodiment, the instructions may cause the processor to render the avatar with a first motion type matched with the costume type or the body type, and refrain from rendering the avatar with a second motion type not matched with the costume type or the body type.

According to an embodiment, the instructions may cause the processor to identify a motion range of each of a plurality of joints forming the appearance of the avatar, based on the constraint information and to render the avatar with motion based on the identified motion range.

As described above, a method of an electronic device may include obtaining character data indicating an appearance of an avatar, obtaining asset data indicating at least one of a costume or an accessory of the avatar, generating region information indicating a relationship between a plurality of regions of the appearance of the avatar and a location of at least one of the costume or the accessory, and storing the asset data and the region information in a memory of the electronic device.

According to an embodiment, the generating of the region information may include identifying a first region overlapping with at least one of the costume or the accessory in the plurality of regions, identifying a second region different from the first region in the plurality of regions, and generating the region information to indicate the first region and the second region.

According to an embodiment, the method may further include generating a package file including the character data, the asset data, and the region information and transmitting the package file to an external server.

According to an embodiment, the method may further include identifying a costume type included in the asset data or a body type of the avatar included in the character data, generating constraint information for restricting a motion of the avatar based on the costume type or the body type, and storing the constraint information in the memory.

According to an embodiment, the generating of the constraint information may include identifying a first motion type matched with the costume type or the body type among a plurality of specified motion types, identifying a second motion type not matched with the costume type or the body type among the plurality of specified motion types, and generating the constraint information to indicate the first motion type and the second motion type.

According to an embodiment, the generating of the constraint information may include identifying a plurality of joints forming the appearance of the avatar, setting a motion range of each of the plurality of joints, based on the identified costume type or the identified body type, and generating the constraint information to include the set motion range.

According to various embodiments disclosed in the present disclosure, the electronic device may include various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

Various embodiments of the disclosure and terms used herein are not intended to limit the technical features described in the disclosure to specific embodiments, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

The term "module" used herein may include a unit, which is implemented with hardware, software, or firmware, and may be interchangeably used with the terms "logic", "logical block", "part", "circuit", or the like. The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the disclosure may be implemented with software (e.g., program 140) including one or more instructions stored in a storage medium (e.g., the internal memory 136 or the external memory 138) readable by a machine (e.g., the electronic device 101). For example, the processor (e.g., the processor 120) of the machine (e.g., the electronic device 101) may call at least one instruction of the stored one or more instructions from a storage medium and then may execute the at least one instruction. This enables the machine to operate to perform at least one function depending on the called at least one instruction. The one or more instructions may include a code generated by a compiler or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily.

According to an embodiment, a method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to various embodiments, each component (e.g., a module or a program) of the above-described components may include a single entity or a plurality of entities. According to various embodiments, one or more the components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, program, or other components may be executed by a successive method, a parallel method, a repeated method, or a heuristic method, or one or more of the operations may be executed in different sequences or omitted. Alternatively, one or more other operations may be added.

According to embodiments disclosed in the specification, an electronic device may efficiently convert the file format of 3D model data, thereby reducing the time and cost required to generate an avatar.

According to embodiments disclosed in the specification, the electronic device with limited power consumption may efficiently convert and verify the data used to render the avatar.

Besides, a variety of effects directly or indirectly understood through the disclosure may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a processor; and
a memory, wherein the memory stores instructions that, when executed, cause the processor to:
obtain character data indicating an appearance of an avatar;
obtain asset data indicating a costume or an accessory of the avatar;
generate region information indicating a relationship between a plurality of regions of the appearance of the avatar and a location of the costume or the accessory;
identify a costume type included in the asset data;
generate constraint information indicating at least one restriction on animations applicable to the avatar based on the costume type; and
store the asset data, the region information and the constraint information in the memory.

2. The electronic device of claim 1, wherein the instructions further cause the processor to:
store the region information as a part of the asset data; or
store the region information as a file separate from the asset data.

3. The electronic device of claim 1, wherein the instructions further cause the processor to:
identify a first region overlapping with the costume or the accessory in the plurality of regions;
identify a second region different from the first region in the plurality of regions; and
generate the region information to indicate the first region and the second region.

4. The electronic device of claim 1, wherein the instructions further cause the processor to:
obtain first character data and first asset data generated by a design dedicated tool;
convert the first character data to the character data configured to be rendered by a mobile device; and
convert the first asset data to the asset data configured to be rendered by the mobile device.

5. The electronic device of claim 1, further comprising:
a wireless communication circuit configured to perform wireless communication with an external server,
wherein the instructions further cause the processor to:
generate a package file including the character data, the asset data, and the region information; and
transmit the package file to the external server through the wireless communication circuit.

6. The electronic device of claim 1, wherein the instructions further cause the processor to:
identify a first motion type matched with the costume type among a plurality of specified motion types;
identify a second motion type not matched with the costume type among the plurality of specified motion types; and
generate the constraint information to indicate the first motion type and exclude the second motion type.

7. The electronic device of claim 1, wherein the instructions further cause the processor to:
identify a plurality of joints forming the appearance of the avatar;
set a motion range of each of the plurality of joints, based on the identified costume type or an identified body type; and
generate the constraint information to include the set motion range.

8. An electronic device comprising:
a display;
a wireless communication circuit;
a processor; and
a memory, wherein the memory stores instructions that, when executed, cause the processor to:
obtain character data indicating an appearance of an avatar through the wireless communication circuit;
obtain asset data indicating a costume or an accessory of the avatar;
identify region information indicating a relationship between a plurality of regions of the appearance of the avatar and a location of the costume or the accessory; and
identify a type of the costume included in the asset data;
obtain constraint information through the wireless communication circuit indicating at least one restriction on animations applicable to the avatar based on the identified type of the costume; and
render the avatar through the display based on the identified region information such that a portion of the plurality of regions that is rendered does not overlap with the costume and the accessory.

9. The electronic device of claim 8, wherein the region information is included in the asset data or a file separate from the asset data.

10. The electronic device of claim 9, wherein the instructions further cause the processor to:
identify a first region overlapping with the costume or the accessory in the plurality of regions; and
identify a second region different from the first region in the plurality of regions,
wherein the first region is rendered based on the asset data, and
wherein the second region is rendered based on the character data.

11. The electronic device of claim 8, wherein the instructions further cause the processor to:
render the avatar with motion of a specified range of motion, based on the constraint information, a body type of the avatar included in the character data, and/or a costume type included in the asset data.

12. The electronic device of claim 11, wherein the instructions further cause the processor to:
render the avatar with a first motion type matched with the costume type; and
exclude from rendering a second motion type not matched with the costume type.

13. The electronic device of claim 11, wherein the instructions further cause the processor to:
identify a motion range of each of a plurality of joints forming the appearance of the avatar, based on the constraint information; and
animate the avatar based on the identified motion range.

14. A method of an electronic device, the method comprising:
obtaining, by at least one processor, character data indicating an appearance of an avatar;
obtaining asset data indicating a costume or an accessory of the avatar;
generating region information indicating a relationship between a plurality of regions of the appearance of the avatar and a location of the costume or the accessory; and
identifying a costume type included in the asset data;
generating constraint information indicating at least one restriction on animations applicable to the avatar based on the costume type; and
storing the asset data and the region information in a memory of the electronic device.

15. The method of claim 14, wherein the generating of the region information further comprises:
identifying a first region overlapping with the costume or the accessory in the plurality of regions;
identifying a second region different from the first region in the plurality of regions; and
generating the region information to indicate the first region and the second region.

16. The method of claim 14, further comprising:
generating a package file including the character data, the asset data, and the region information; and
transmitting the package file to an external server.

17. The method of claim 14, wherein the generating of the constraint information further comprises:
identifying a first motion type matched with the costume type among a plurality of specified motion types;
identifying a second motion type not matched with the costume type among the plurality of specified motion types; and
generating the constraint information to indicate the first motion type and exclude the second motion type.

18. The method of claim 14, wherein the generating of the constraint information further comprises:
identifying a plurality of joints forming the appearance of the avatar;
setting a motion range of each of the plurality of joints, based on the identified costume type or an identified body type; and
generating the constraint information to include the set motion range.

* * * * *